United States Patent [19]
Leblond

[11] 3,895,518
[45] July 22, 1975

[54] TIRE TESTING MACHINE
[75] Inventor: Jean R. Leblond, Compiegne, France
[73] Assignee: Uniroyal (France), Clairoix, France
[22] Filed: Jan. 10, 1974
[21] Appl. No.: 432,256

[30] Foreign Application Priority Data
Feb. 19, 1973 France .............................. 73.05810

[52] U.S. Cl. ................................ 73/146; 33/178 R
[51] Int. Cl. .......................................... G01m 17/02
[58] Field of Search .......:.. 73/146, 146.2; 33/178 R, 33/178 D, 169 R

[56] References Cited
UNITED STATES PATENTS

| | | | |
|---|---|---|---|
| 2,251,803 | 8/1941 | Pummill | 73/146 |
| 3,206,973 | 9/1965 | Obarski | 73/146 |
| 3,303,571 | 2/1967 | Veals | 73/146 |
| 3,534,598 | 10/1970 | Hermanns et al. | 73/146 |
| 3,543,576 | 12/1970 | Bishop | 73/146 |

Primary Examiner—Donald O. Woodiel
Attorney, Agent, or Firm—Philip Sands, Esq.

[57] ABSTRACT

A machine or apparatus for measuring dimensional characteristics of a pneumatic tire test sample, the apparatus including a stationary frame and a movable frame pivotally supported upon the stationary frame. A pair of bead-holding members are shiftably supported upon the movable frame for axially engaging the bead regions of a tire sample in air-tight relation to permit inflation of the sample. A road-simulating idler drum is mounted upon the stationary frame and is radially engageable by the tread of the tire sample. The drum exerts road-simulating radial loads against the tread of the sample when the latter is pressed thereagainst and rotated. A number of tread and sidewall sensing and measuring units are arranged upon the movable frame for engaging the tire sample to effect measurement of selected dimensional characteristics thereof.

34 Claims, 15 Drawing Figures

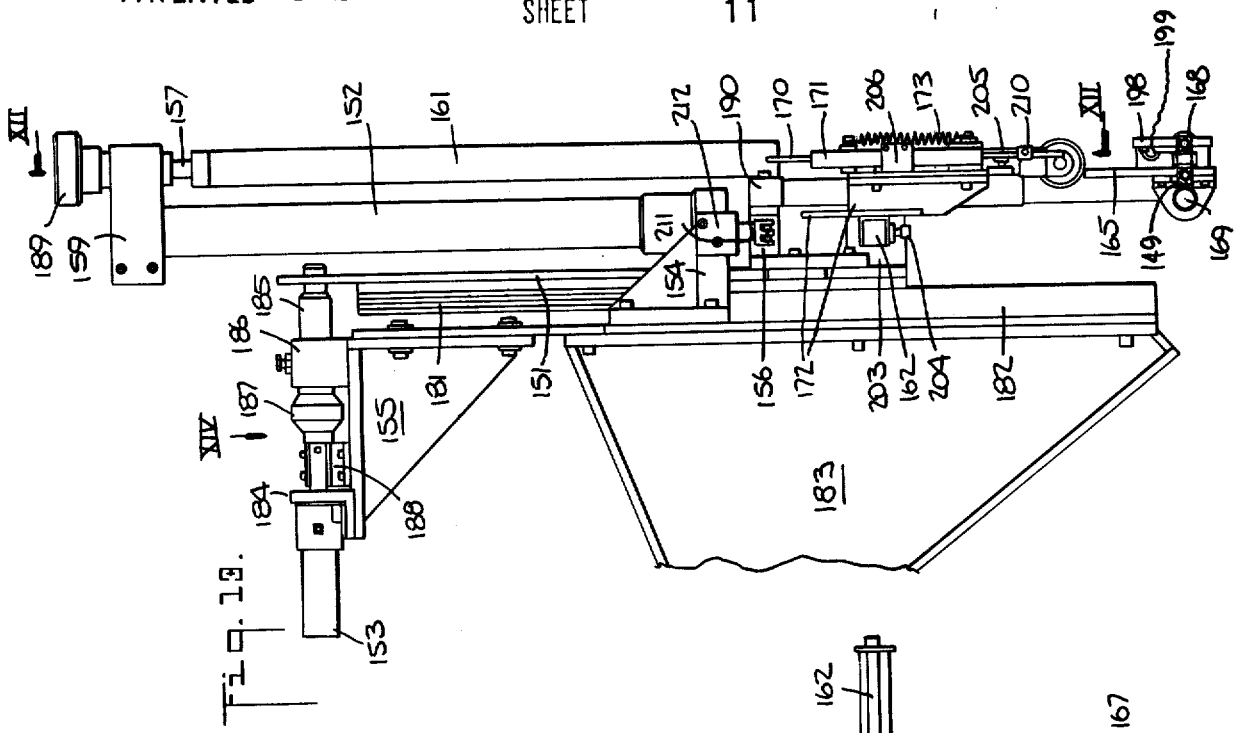
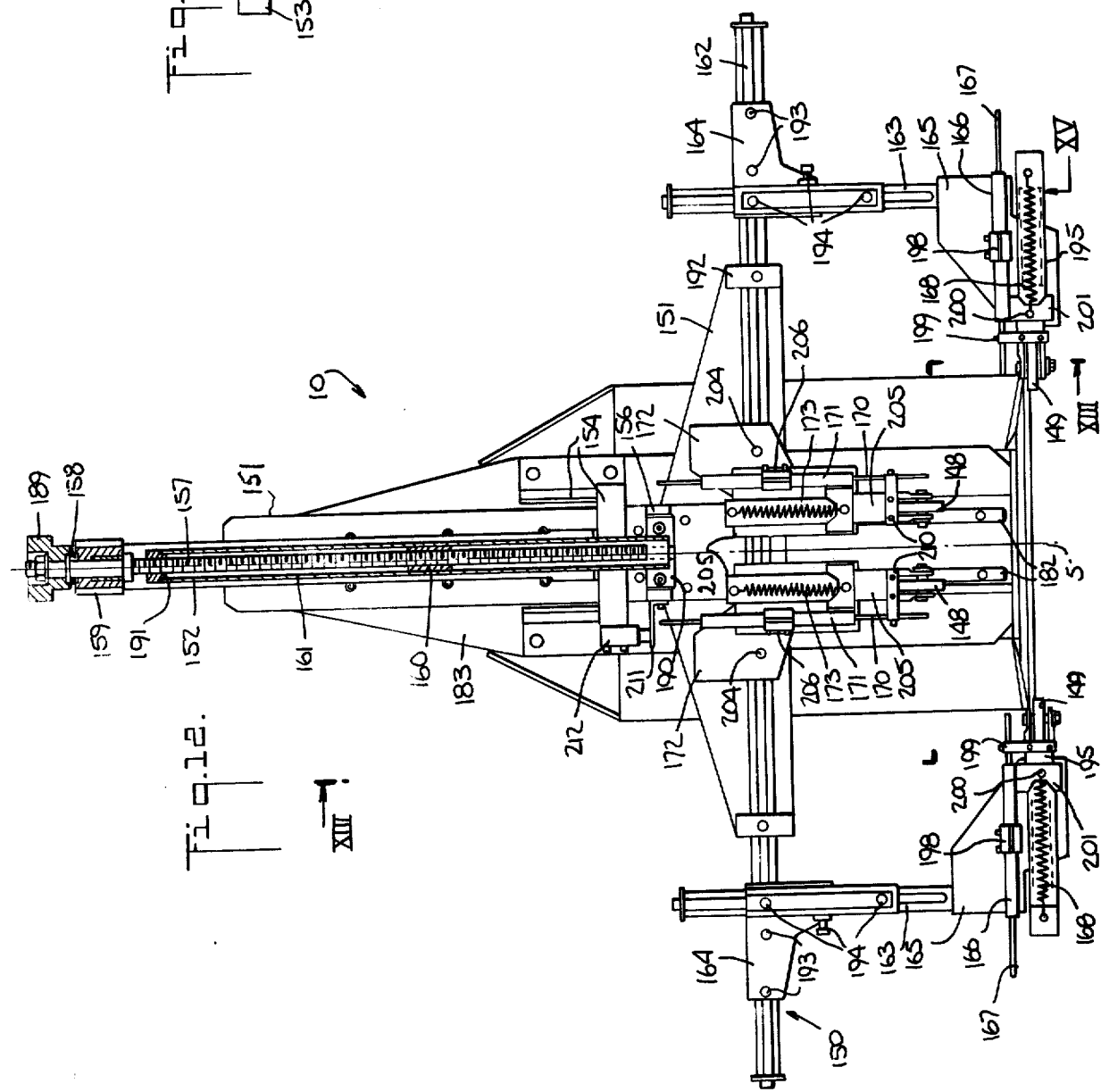
Fig. 13.
Fig. 12.

TIRE TESTING MACHINE

The foregoing Abstract is neither intended to define the invention disclosed in the specification nor is it intended to limit the scope of the invention in any way.

BACKGROUND OF THE INVENTION

The present invention relates generally to means for effecting quality control over the fabrication or building of pneumatic tires, and more particularly to apparatus for detecting and determining the location and extent of various static dimensional defects in newly fabricated pneumatic tires which negatively effect the dynamic behavior of the latter.

As is well known, pneumatic tires often exhibit certain undesirable characteristics in the course of their use on automobiles and various other vehicles. Such characteristics, which result from rare but nonetheless occurring errors made in the course of fabricating the tires, are related to various dimensional defects in the tread and/or sidewalls of the tires. Such defects may result from the lack of proper tolerance control over the various tire portions, and may be present in the form of either excessive or insufficient stiffness in the tread and/or sidewalls of the tires.

Tires with such defects often exhibit non-uniform or asymmetric characteristics which cause disturbances in a moving vehicle upon which they are mounted. The disturbances are pronounced manifestations of one or the other or both of two effects which are referred to herein as "conicity" and "sinuousness". A conicity effect tends to continually and unpredictably alter the path of the movement of the tire either to left or to the right of a desired path of movement, regardless of the direction of rotation of the tire, in much the same manner as in the case of a cone rolling on its side on the ground. A sinuousness effect tends to continuously alternate the path of movement of the tire from one side to the other side of a desired path, likewise regardless of the direction of rotation of the tire, the path actually followed being similar to a path that a snake would make in moving over the ground.

When a vehicle is provided with one or more tires having a pronounced conicity or sinuousness effect, there is a tendency for the vehicle to pull away from a desired driving path, requiring the driver of the vehicle to make constant steering corrections to accommodate same. Moreover, this causes unpleasant movement and vibrations in the vehicle, particularly at high speeds, as well as excessive tire wear.

A number of tire testing machines are already known for overseeing quality control over newly fabricated tires, such as the machine disclosed in U.S. Pat. No. 3,473,422, issued on Oct. 21, 1969, to J. Leblond. However, such machines require an excessive number of manual operations during the course of testing a particular tire sample, and thus have relatively low operational speeds. Moreover, such machines require an excessive number of manual adjustments and part changes for permitting testing of tire samples of different sizes.

SUMMARY OF THE INVENTION

Accordingly, it is an object of the present invention to provide a new and novel tire testing machine or apparatus which does not have disadvantages associated with those of the prior art.

It is another object of the present invention to provide a machine or apparatus for measuring dimensional characteristics of pneumatic tire samples, and more particularly for determining various dimensional defects in such tire samples.

Further objects and advantages of this invention will become apparent as the following description proceeds.

Briefly stated, and in accordance with one embodiment of the present invention, the machine or apparatus includes a pair of bead-holding members which are axially movable relative to one another into engagement with corresponding bead regions of a given pneumatic tire sample. The bead-holding members seal the bead regions against air-leakage and permit inflation of the tire sample. The bead-holding members are mounted on a movable frame which is mounted upon and pivotal relative to a stationary frame carrying a road-simulating idler drum. The bead-holding members may be rotated so as to rotatably press the tread of the tire sample against the idler drum, the latter generating road-simulating loads against the tread. A number of tread and sidewall sensing units are provided for effecting measurement of selected dimensional characteristics of the tire sample as the latter is rotated and pressed against the drum. An assembly may be associated with the sensing units for converting the measured characteristics into visual data.

BRIEF DESCRIPTION OF THE DRAWINGS

While the specification concludes with claims particularly pointing out and distinctly claiming the subject matter regarded as the invention herein, it is believed that the invention will be better understood from the following description taken in conjunction with the accompanying drawings, in which:

FIG. 12 is an enlarged, schematic, front view of the tire-sensing units of the present invention, which units are encircled by dashed line XII in FIG. 1, and viewed along the section line XII—XII in FIG. 13;

FIG. 13 is a schematic elevational view taken along the section line XIII—XIII in FIG. 12;

DETAILED DESCRIPTION OF THE INVENTION

Figure 1:
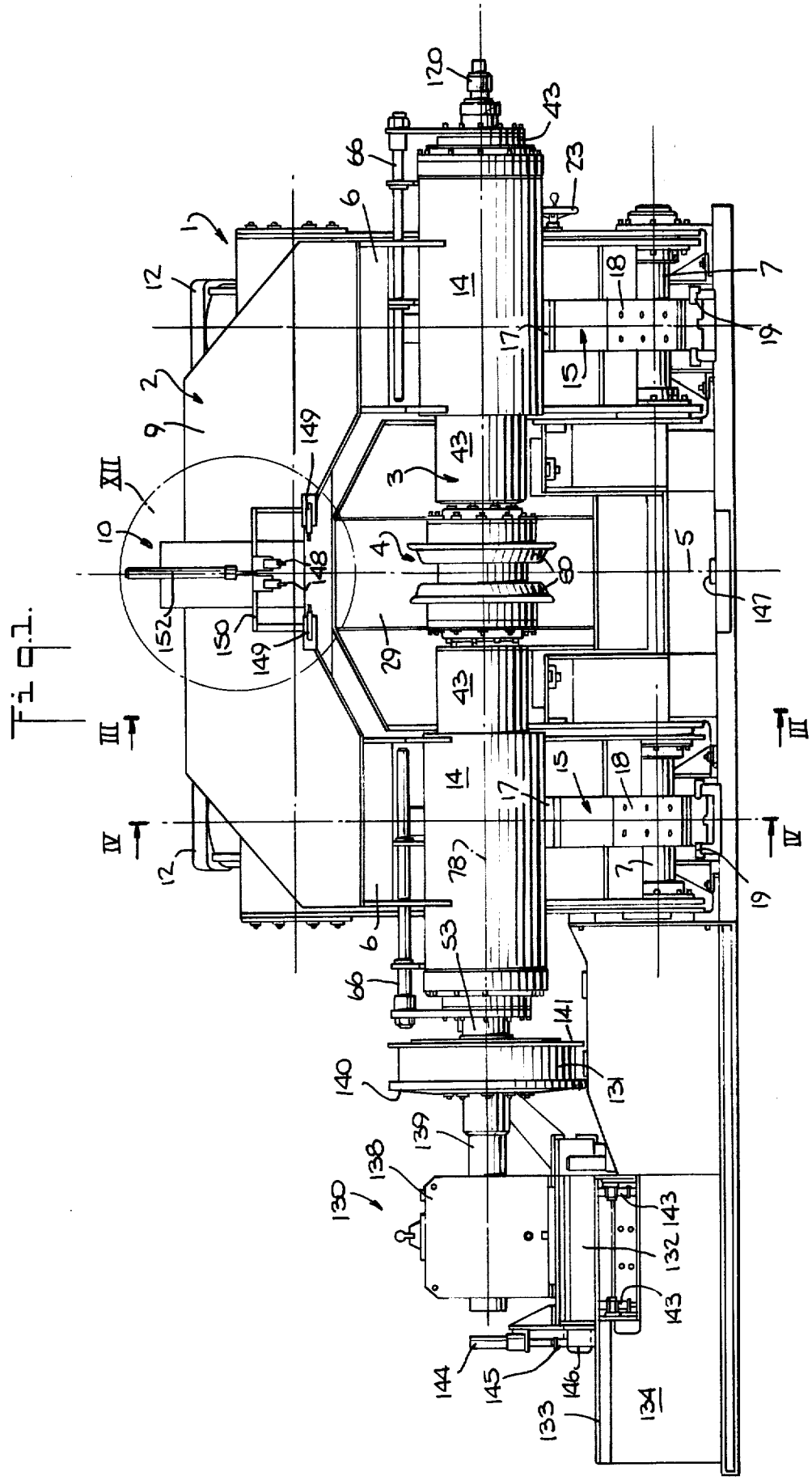
FIG. 1 is a frontal, schematic, elevational view of the machine pursuant to the present invention.

Referring now to the drawings, and more particularly to FIGS. 1 through 5, the present invention relates to a machine or apparatus having a stationary frame 1, and a pivotal frame 2 hinged to the stationary frame 1. The pivotal frame 2 is provided with a tire supporting unit 3 which in turn is provided with a bead-holding unit 4 upon which a tire test sample may be directly mounted.

Figure 2:
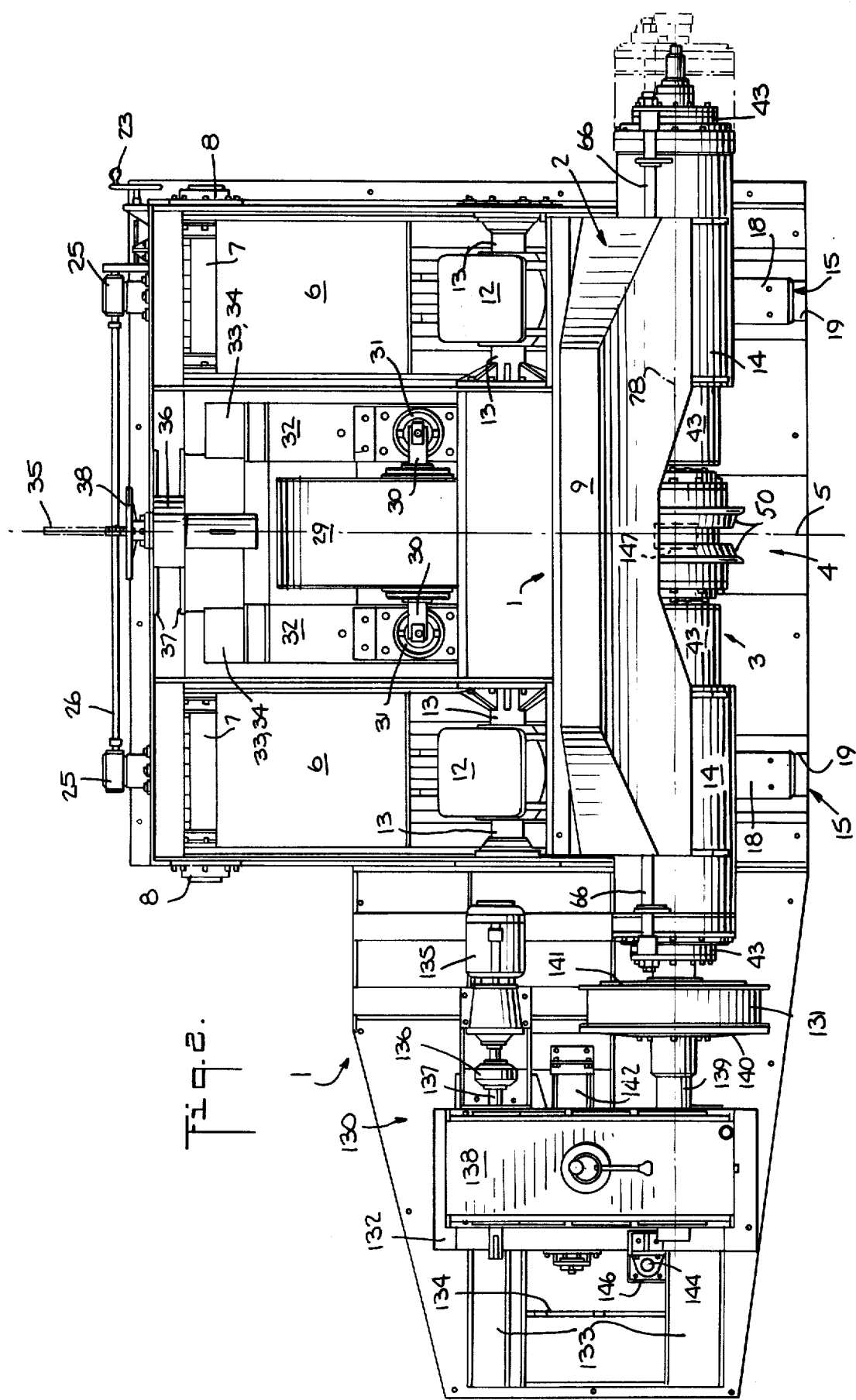
FIG. 2 is a top plan view of the machine illustrated in FIG. 1.
Figure 3:
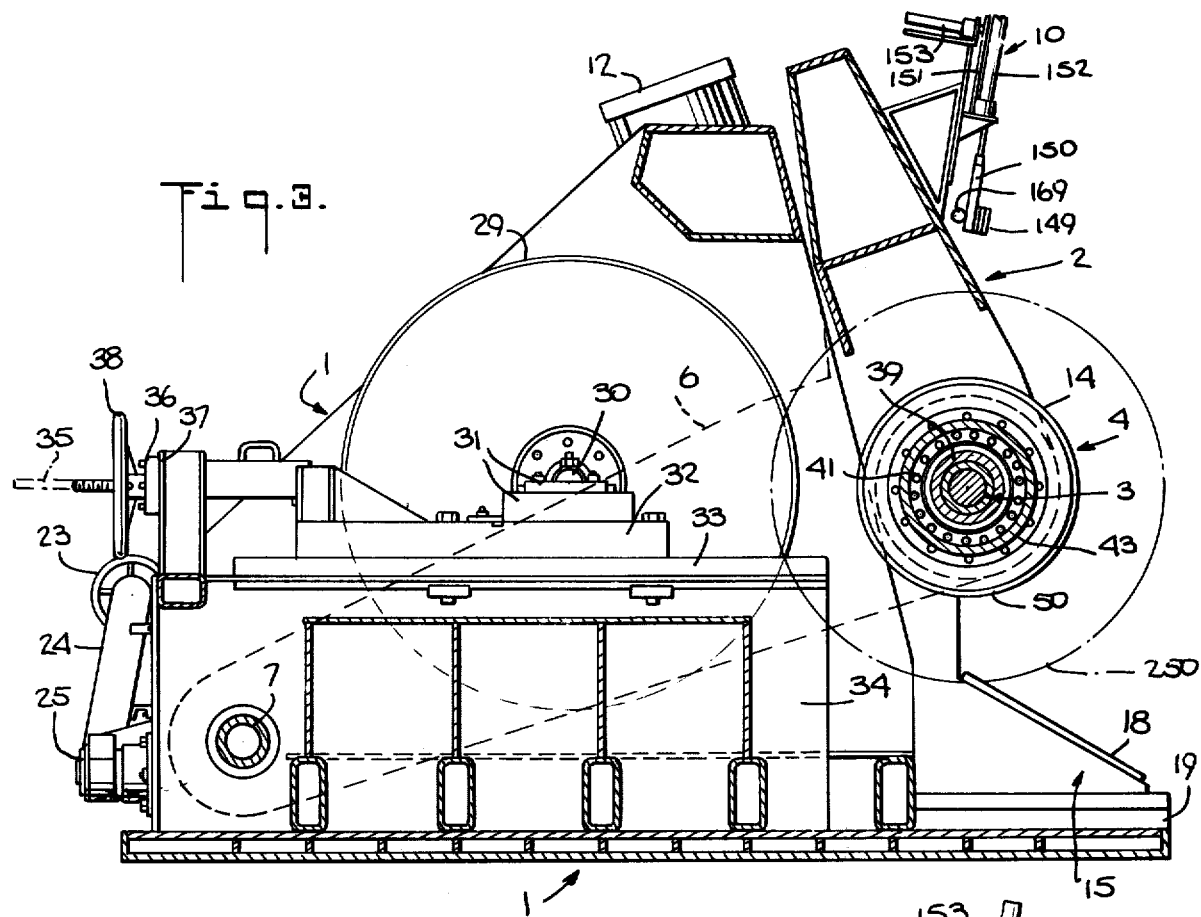
FIG. 3 is a schematic elevational view, on reduced scale, taken along the section line III—III in FIG. 1.

As best shown in FIG. 2, the pivotal frame 2 is in the form of a symmetrical yoke having a plane of symmetry defined by the vertical line 5 which passes through the center of unit 4. The pivotal frame 2 includes a pair of parallel arms 6 which are hinged coaxially to the stationary frame 1 by means of respective pins 7 seated in respective bearings 8. The two arms 6 are preferably joined to one another at their rear end portions by means of a brace or upper crosspiece 9 upon which is mounted a tire detection and measuring unit 10 (omitted from FIG. 2 for the sake of clarity). Each arm 6 of the pivotal frame 2 is hinged at reference character 11 (FIGS. 4 and 5) to a respective one of a pair of piston rods associated with corresponding power cylinders or jacks 12 of pneumatic or hydraulic nature. The cylinders of the jacks 12 are in turn pivotally fastened to the stationary frame 1 by means of respective pin-and-bearing units 13 (FIG. 2).

At the lower frontal portion of the pivotal frame 2, there is provided a pair of cylindrical housings or barrels 14 in which are confined, respectively, the left and right-hand portions of the unit 3. The barrels 14 are coaxially aligned with and spaced from one another through the intermediary of the unit 4. The barrels 14 are means by which the lower frontal portion of the pivotal frame 2 rests upon the stationary frame 1, and more particularly upon a pair of spaced shoes 15, respectively. For this purpose, each barrel 14 is provided with a heel 16 which is adapted to directly engage and rest upon a corresponding one of the shoes 15.

Each shoe 15 (FIG. 4) is provided with an upper, generally horizontally disposed, platform 17 upon which the heels 16 of the barrels 14 are adapted to rest, respectively. Each of the shoes 15 further includes a generally inclined plane 18 with which the rounded apex of each of the heels 16 is adapted to engage when the frame 2 is pivotally moved into a lowermost inactive position for receiving a tire sample.

Figure 4:
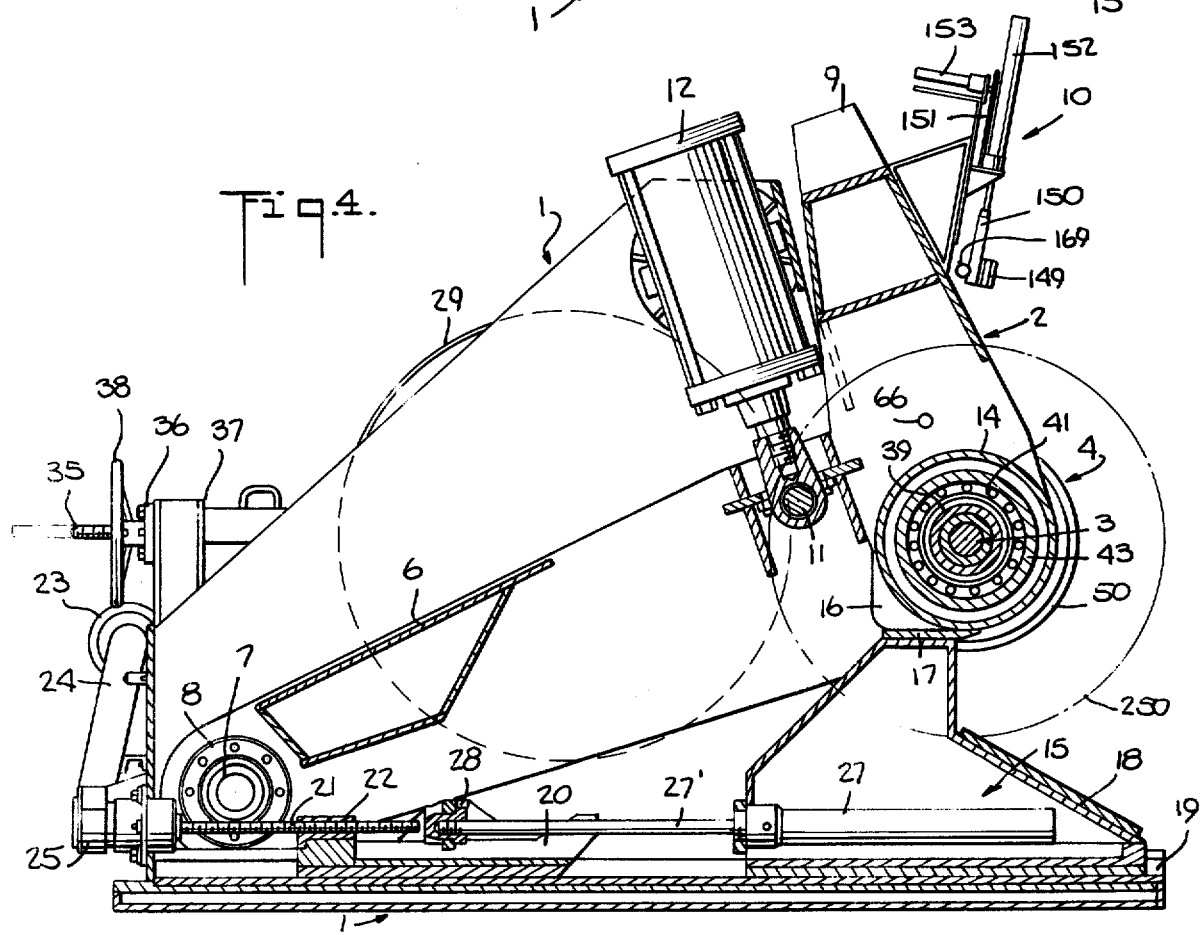
FIG. 4 is a view similar to FIG. 3, but taken along the section line IV—IV in FIG. 1.
Figure 5:
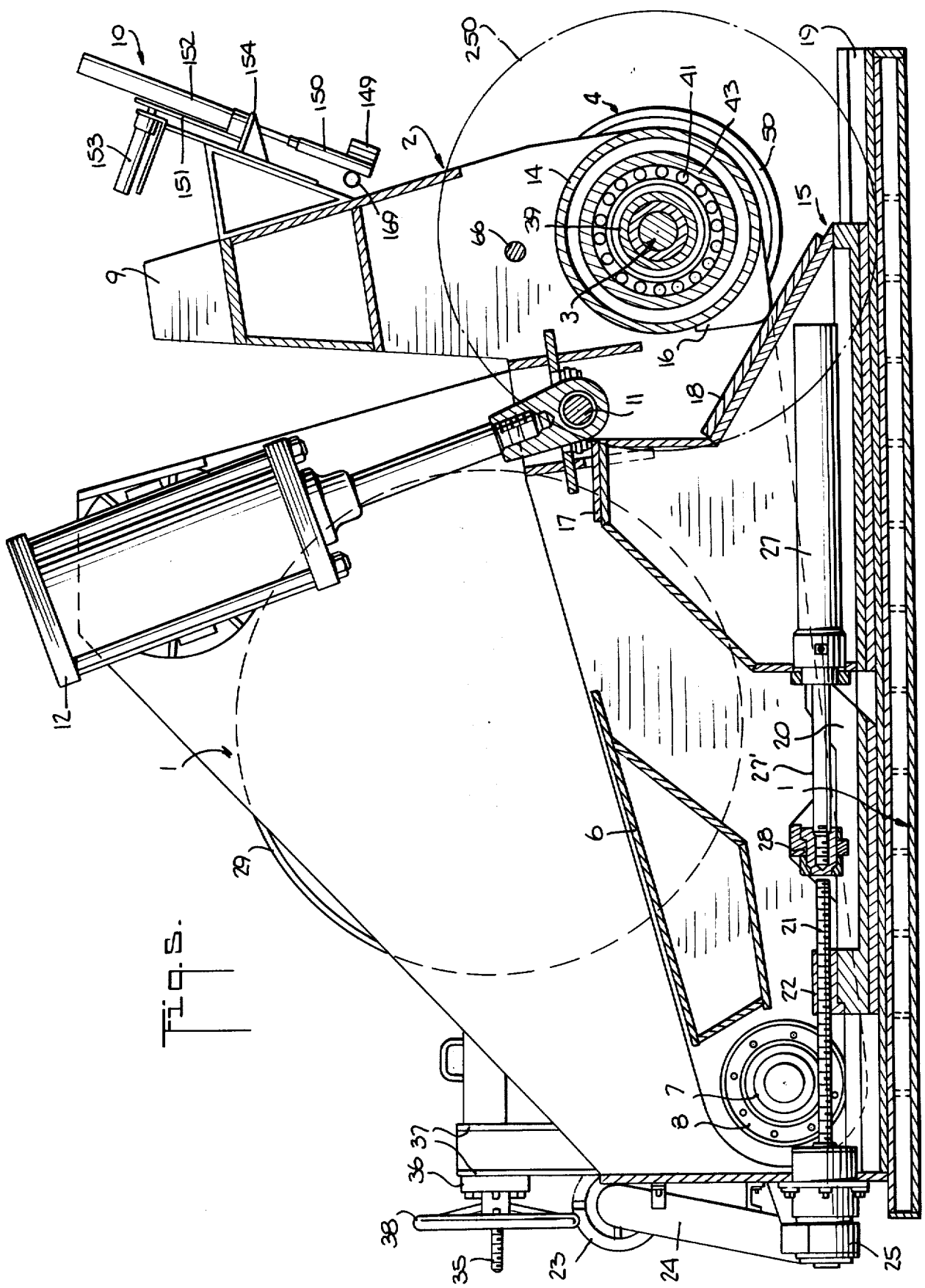
FIG. 5 is a view similar to FIGS. 3 and 4, on enlarged scale, and illustrating the pivotal frame of the machine in a lowered position for receiving a pneumatic tire sample.

Referring now to FIGS. 4 and 5, the relative position of each shoe 15 can be selectively adjusted relative to the stationary frame 1 along a respective one of a pair of tracks 19 which are integral with stationary frame 1 and parallel to one another. Each shoe 15 is, furthermore, associated with one of a pair of abutment members 20 which are adjustable relative to corresponding ones of the tracks 19. In this respect, each abutment member 20 is coupled with a respective threaded shaft 21 which seats threadedly within one of a pair of internally threaded members 22 affixed to the stationary frame 1. A crank or hand-wheel 23 is operatively associated with each of the threaded shafts 21 for effecting simultaneous rotation of the latter through the intermediary of a transmission system 24 and respective pairs of mating beveled gear 25. The driver ones of the beveled gears 25 are coupled with one another, for example, through the intermediary of a common rotary tie shaft 26 (FIG. 2). Thus, rotation of the hand-wheel 23 effects joint movement of each of the abutment members 20 along the tracks 19 for limiting rearwise displacement of the shoes 15.

In order to effect selective displacement of each of the shoes 15 relative to the tracks 19, each shoe 15 is provided with a respective power cylinder or jack 27 (hydraulic or pneumatic). The cylinders of the jacks 27 are affixed to the shoes 15, respectively, whereas their corresponding piston rods 27' are each affixed to a corresponding abutment member 20 via a respective coupling 28. It will be understood, that the free end of each of the shafts 22 is rotatably mounted in a respective coupling 28. Retraction of the piston rods 27' will cause the cylinders of each of the jacks 27 and the shoes 15 associated therewith to shift to the left in FIG. 4 and eventually abut against each of the abutment members 20.

Interposed between the pair of arms 6 of the pivotal frame 2, is a cylindrical road-simulating drum 29. The drum 29 is symmetrically disposed relative to the plane 5 and is freely journaled upon the stationary frame 1. The position of the axis of the drum 29 may be adjusted relative to the stationary frame 1, and to this end the drum 29 is freely journaled upon a shaft 30 which is at its opposite ends mounted in suitable bearings 31. The bearings are mounted, respectively, upon a pair of carriages 32 that are slidably mounted upon respective tracks 33. The tracks 33 are affixed upon a raised platform 34 which in turn is affixed to the stationary frame 1. The bearings 31 are each associated with conventional sensing or detecting devices, in the form of transducers or the like (not shown), which are designed to measure a radial force or load applied against the drum 29. The outer periphery of the drum 29 is preferably coated with a non-skid or roughened, textured, material having a high friction coefficient so as to prevent a tire sample radially engaging the drum 29 from slipping relative to the latter.

The position of each carriage 32 relative to its corresponding track 33 is adjustable such as by means of a horizontally disposed threaded shaft 35. The shaft 35 terminates in one end to which is affixed each of the carriages 32 (via respective brackets or the like), and has an intermediary portion which is threadedly mounted in an internally threaded member 36 mounted upon a bracket 37 affixed to the stationary frame 1. The opposite end of the threaded shaft 35 is associated with a hand-wheel or crank 38, which when rotated effects rotation and endwise shifting of the threaded shaft 35 relative to the fixed bracket 37 causing displacement of each of the carriages 32 simultaneously relative to the tracks 33.

Figure 6:
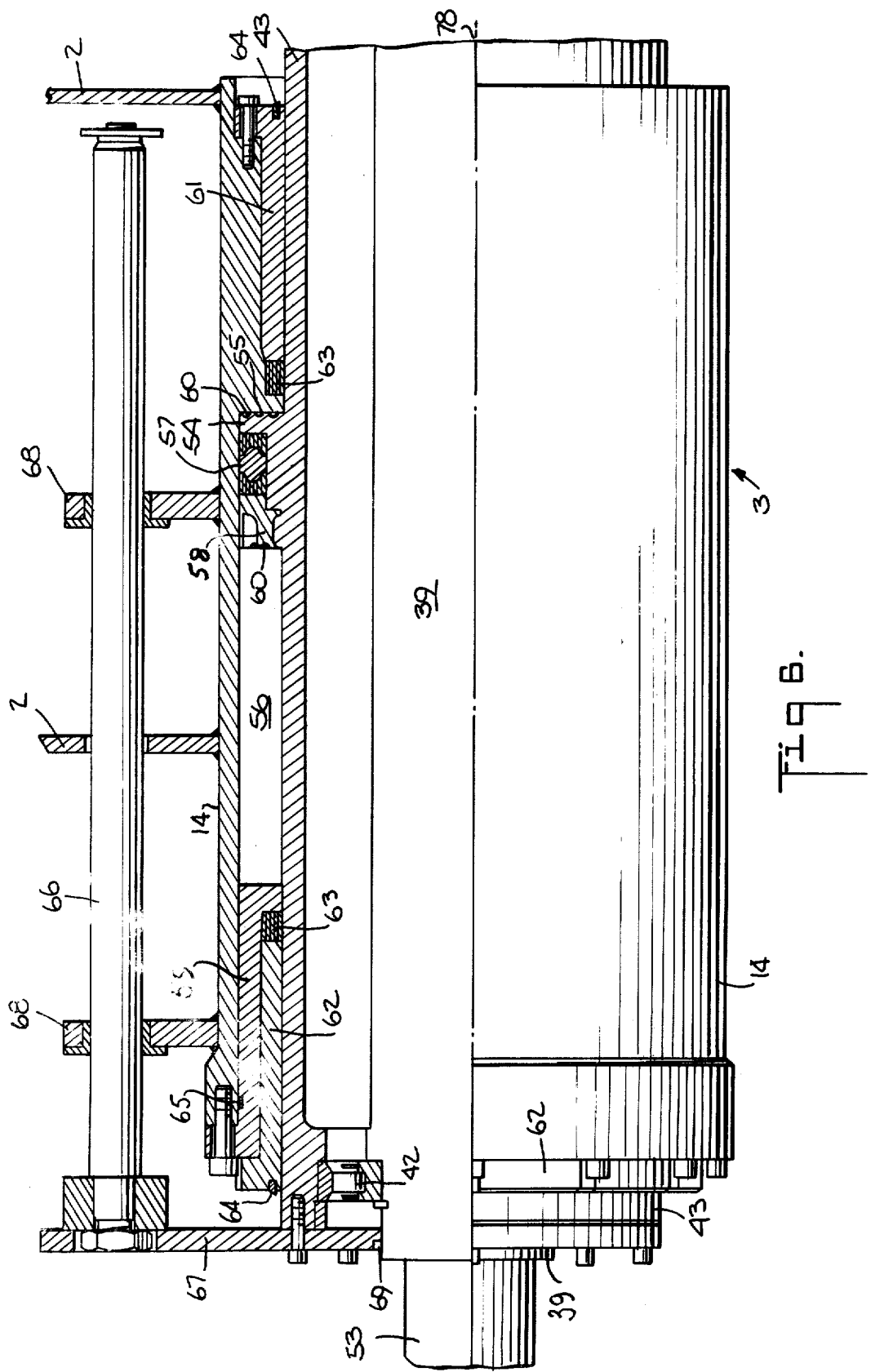
FIG. 6 is an enlarged, fragmentary, axially taken, partial cross-sectional view of the left-side portion of the tire-supporting assembly of the machine.
Figure 7:
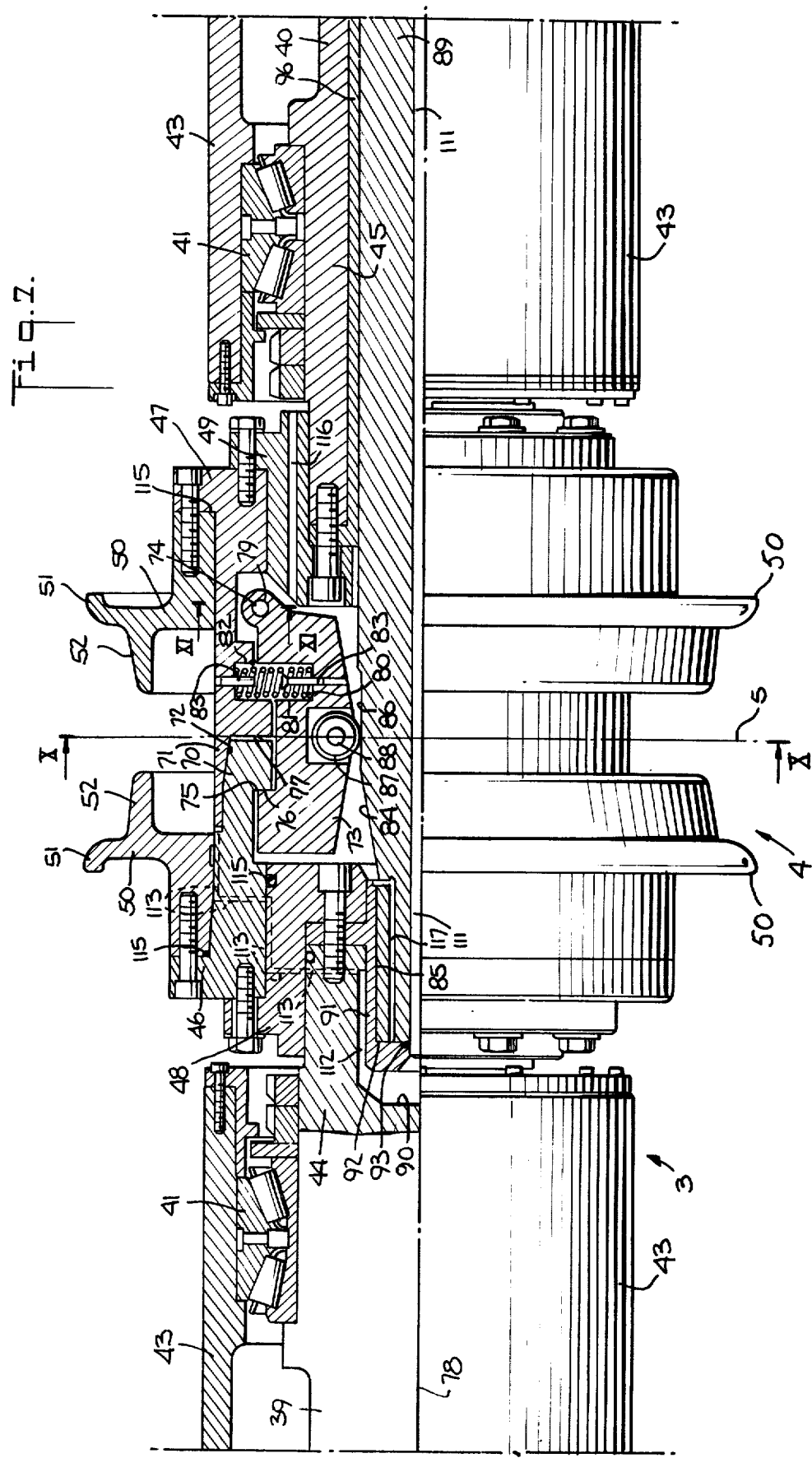
FIG. 7 is a view similar to FIG. 6, in slightly reduced scale, illustrating the interlocked operative association of the bead-holding members associated with the left and right-side tire-supporting assemblies illustrated in FIGS. 6 and 8, respectively.
Figure 8:
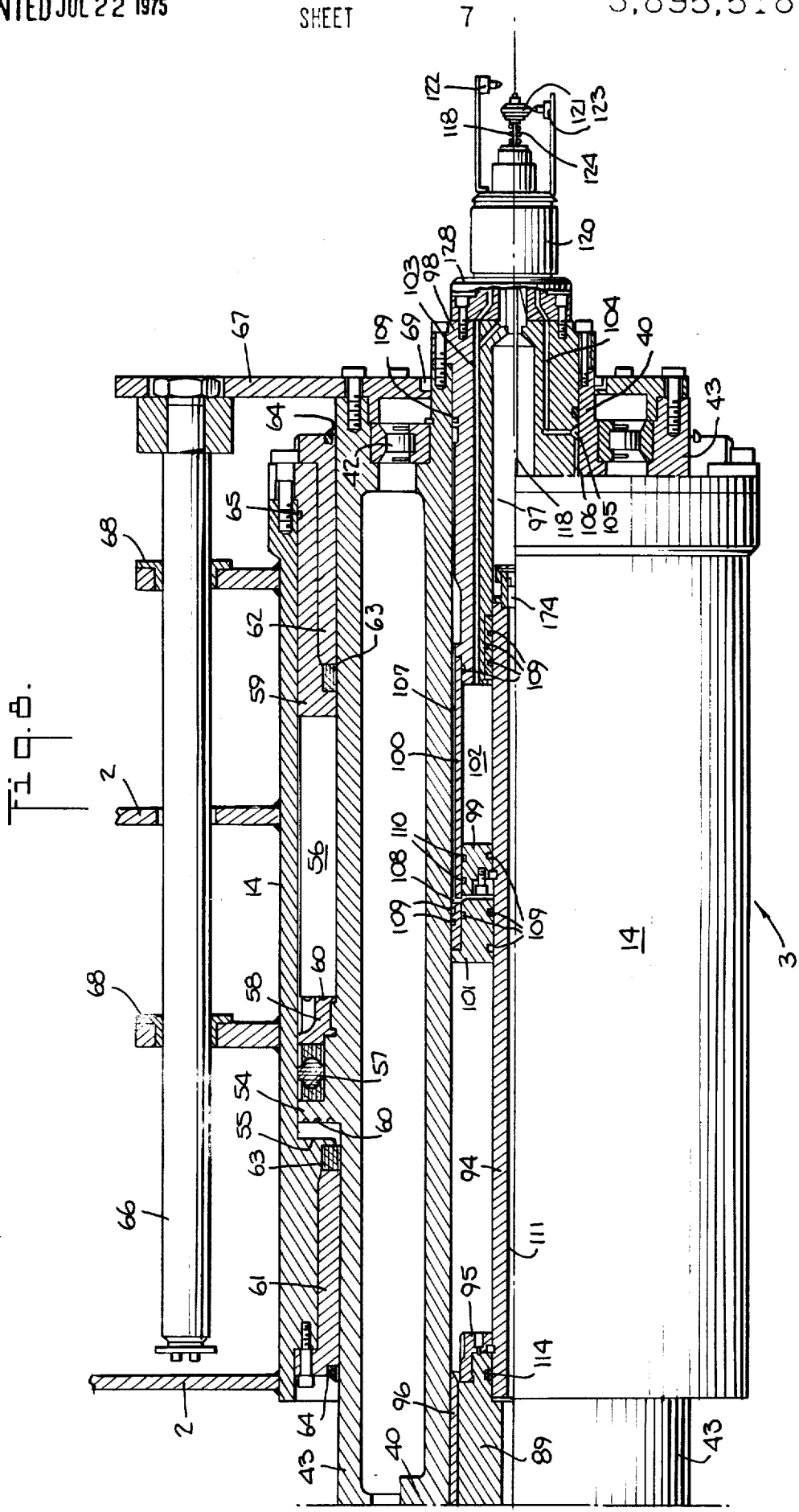
FIG. 8 is a view similar to FIG. 6, on the same scale as the latter, illustrating the right-side tire-supporting assembly, FIGS. 6, 7 and 8 being keyed to one another through the intermediary of the respective vertical dashed lines therein.

Referring now to FIGS. 6 through 8, the unit 3 includes a pair of cooperating, co-axially aligned, shaft portions, i.e., a left shaft portion 39 and a right shaft portion 40. Each of the shaft portions 39 and 40 is journaled in, and constrained against axial movement by, a pair of bearings 41 and 42, each of the bearings being disposed within a respective one of a pair of sleeves 43. Each sleeve 43 is endwise or axially shiftable relative to (together with its corresponding shaft portion) and confined within a respective one of the barrels 14. The shaft portions 39 and 40 have respective ends 44 and 45 which confront one another and project outwardly from their respective sleeves 43. A pair of hubs 46 and 47 are respectively mounted upon the confronting ends 44 and 45 of the shaft portions 39 and 40 through the intermediary of respective annular spacer members 48 and 49.

The hubs 46 and 47 detachably mount respective bead-holding members or discs 50 which may be selected to correspond in size with a particular bead ring diameter of a given tire sample. Each of the discs 50 is provided with a flange or an annular shoulder 51 for axially engaging the bead ring of a tire sample, and a generally frustoconical annular body 52 of reduced diameter upon which a bead ring of a tire sample may rest. The discs 50 are axially movable toward or away from one another via the shaft portions 39 and 40 (as will be clarified below), and represent means upon which a tire sample may be mounted in air-sealing relation for inflation. The shaft portion 39 is associated at its free end 53 with a conventional motor or drive means (to be described below), whereas the other shaft portion 40 is driven by the shaft portion 39 through the intermediary of a clamping unit (to be described below).

Each of the sleeves 43 is actuable like a piston rod, and is operatively confined in and axially shiftable relative to a respective cylinder constituted by each of the barrels 14. In this respect, each sleeve 43 is externally provided with an annular flange 54 which is engageable with a respective annular flange 55 disposed within each barrel 14. An axially variable, annular, fluid-receiving, power chamber 56 is disposed between each of the barrels 14 and their corresponding sleeves 43 (FIGS. 6 and 8), there being provided respective annular gaskets or seals 57 which may be tightened by corresponding tightening elements 58 associated with each of the flanges 54 of the sleeves 43.

It will be understood that the annular flange 55 of each barrel 14 represents one end of each of the power chambers 56, whereas the opposite end of each power chamber 56 is defined by an annular plug 59 affixed to each barrel 14. The annular flange 54 of each sleeve 43 and the element 58 associated with each gasket 57 effectively divide each chamber 56 into two subchambers, and are provided with respective recesses 60 to permit the introduction of a fluid into the chambers 56, whether the element 58 is engaged with the plug 59 or the flange 54 is engaged with the barrel flange 55 associated therewith.

Each of the sleeves 43 is slidable within a pair of tubular bushings 61 and 62, the latter each being affixed to the interior of the barrels 14 such as by means of bolts or the like. The opposite ends of each of the bushings 61 and 62 are associated with a pair of gaskets or sealing rings 63 and 64 to prevent leakage of the fluid introduced into the annular power chambers 56. It will be understood that there are input and output ducts associated with each of the power chambers 56, but the latter ducts have not been illustrated for purposes of clarity.

Each of the sleeves 43 is furthermore associated with a rod 66 which extends parallel thereto and externally of their corresponding barrels 14. Each rod 66 is affixed to a bracket 67 which in turn is affixed to a corresponding one of the sleeves 43. The rods 66 are each disposed in and slidable relative to respective apertured guide brackets 68. Thus, each of the sleeves 43 is axially shiftable relative to the barrels 14, but is prevented from rotating relative to latter because of the provision of the rods 66.

It will be understood that the length of each of the rods 66 corresponds substantially to the maximum stroke or displacement that each of the sleeves 43 is to effect relative to the barrels 14. The brackets 67 not only support the rods 66, respectively, but also close the ends of the sleeves 43 and, thereby, conceal the respective bearings 42 adjacent thereto. Appropriate sealing gaskets or rings 69 are interposed between each bracket 67 and its corresponding end of each sleeve 43.

Referring now to FIG. 7 in particular, there is illustrated a unit for clamping the shaft portions 39 and 40 to one another internally of the discs 50. In this respect, an annular free end portion 70 of the hub 46, in the form of a projection of reduced diameter, is adapted to be received by a conforming recessed end portion 71 of the confronting hub 47 when the sleeves 43 are shifted endwise toward one another. The ends 70 and 71 when engaged may be tightly sealed relative to one another through intermediary of a gasket or sealing ring 72 carried by the projection 70.

Each of the hubs 46 and 47 is hollow and, when engaged, together accommodate at least one (but preferably three as will be described with reference to FIG. 10 below) coupling means or latch member 73 in the form of a hook or the like which is pivotally mounted by means of a pin 74 within the interior of the hub 47. The latch member 73 projects into the confines of the hub 46 and is removably engageable with an annular shouldered portion or beak 75 formed in the interior of the hub 46. FIG. 7 illustrates the latch member 73 in a locked condition with beak 75, a radially disposed projection or finger 76 of the latch member 73 being in axial engagement with the beak 75.

Figure 11:
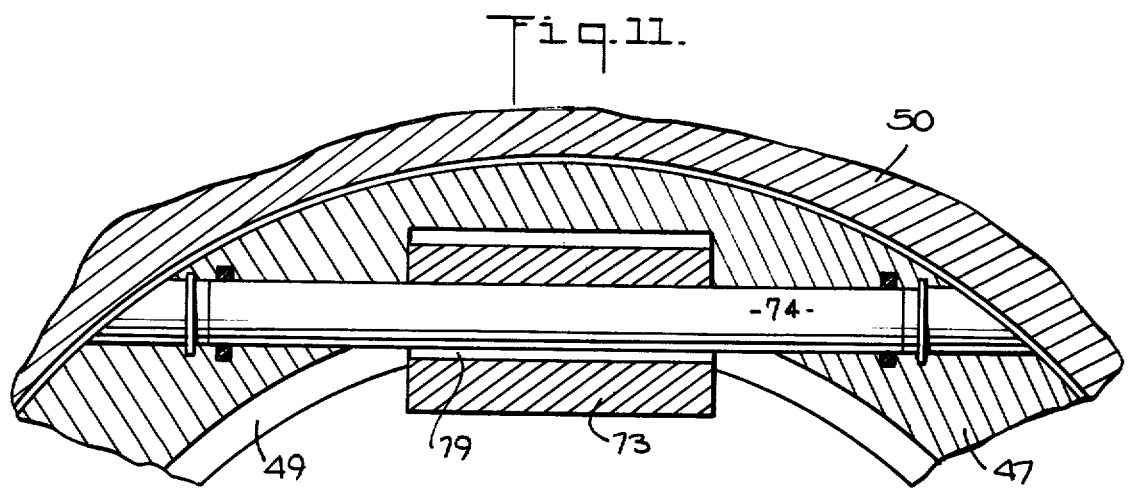
FIG. 11 is a fragmentary cross-sectional view taken along the section line XI—XI in FIG. 7.
Figure 14:
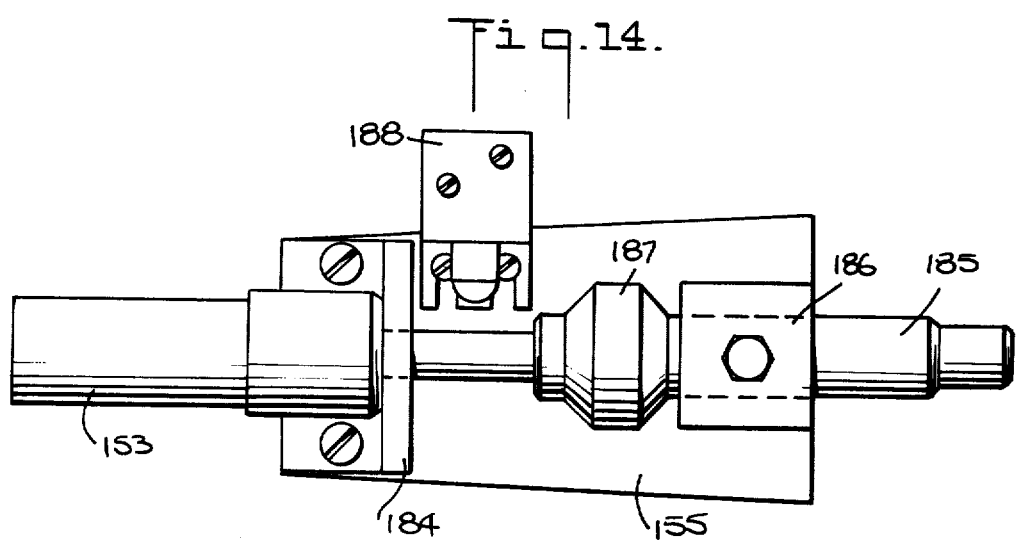
FIG. 14 is an enlarged plan view looking downwardly in the direction of arrow XIV in FIG. 13 of a unit for locking the tire-sensing units in a raised position above the tire sample.

In order to permit the latch member 73 to pivot beyond, or clear, the beak 75 and grip the latter axially, there is provided a slight axial space 77 between the ends 70 and 71 of the hubs 46 and 47, respectively, permitting slight axial displacement of the shaft portion 39 relative to the shaft portion 40. An alternative to the provision of the space 77, is the provision of an oval shaped aperture 79 in the latch member 73 in which is seated the pin 74 (FIG. 11). The latch member 73 may, thereby, be shifted axially relative to the hub 47 and thus, when pivoted relative to the pin 74 thereof, will clear the beak 75. A helical compression spring 80 is seated in a pair of confronting recesses 81 and 82 formed in the latch member 73 and the hub 47, respectively, and is centered in the latter recesses by means of respective posts 83 or the like. The compression spring 80 acts urge the latch member 73 away from beak 75, in a direction toward the axis of symmetry 78 of the sleeves 43, to permit unlocking of the hub 47 from the hub 47.

In order to effect locking of the hubs 46 and 47 with one another, and pivot the latch member 73 against the force of the compression spring 80, there is provided an axially shiftable cam-acting member 84 internally of the shaft portion 40. The member 84 is provided with a pair of cylindrical surfaces 85 and 86 between which is provided a frustoconical surface which is engageable with and causes radial displacement of the latch member 73 via a roller 87 affixed by means of a pin 88 to the latch member 73. It will be understood, as will be clarified below, that when the cam-acting member 84 is shifted to the left in FIG. 7, the latch member 73 will pivot about its pin 74 into engagement with the beak 75 to axially interlock the hubs 46 and 47 with one another so that the hub 46 can subsequently transmit rotation to the hub 47.

Figure 10:
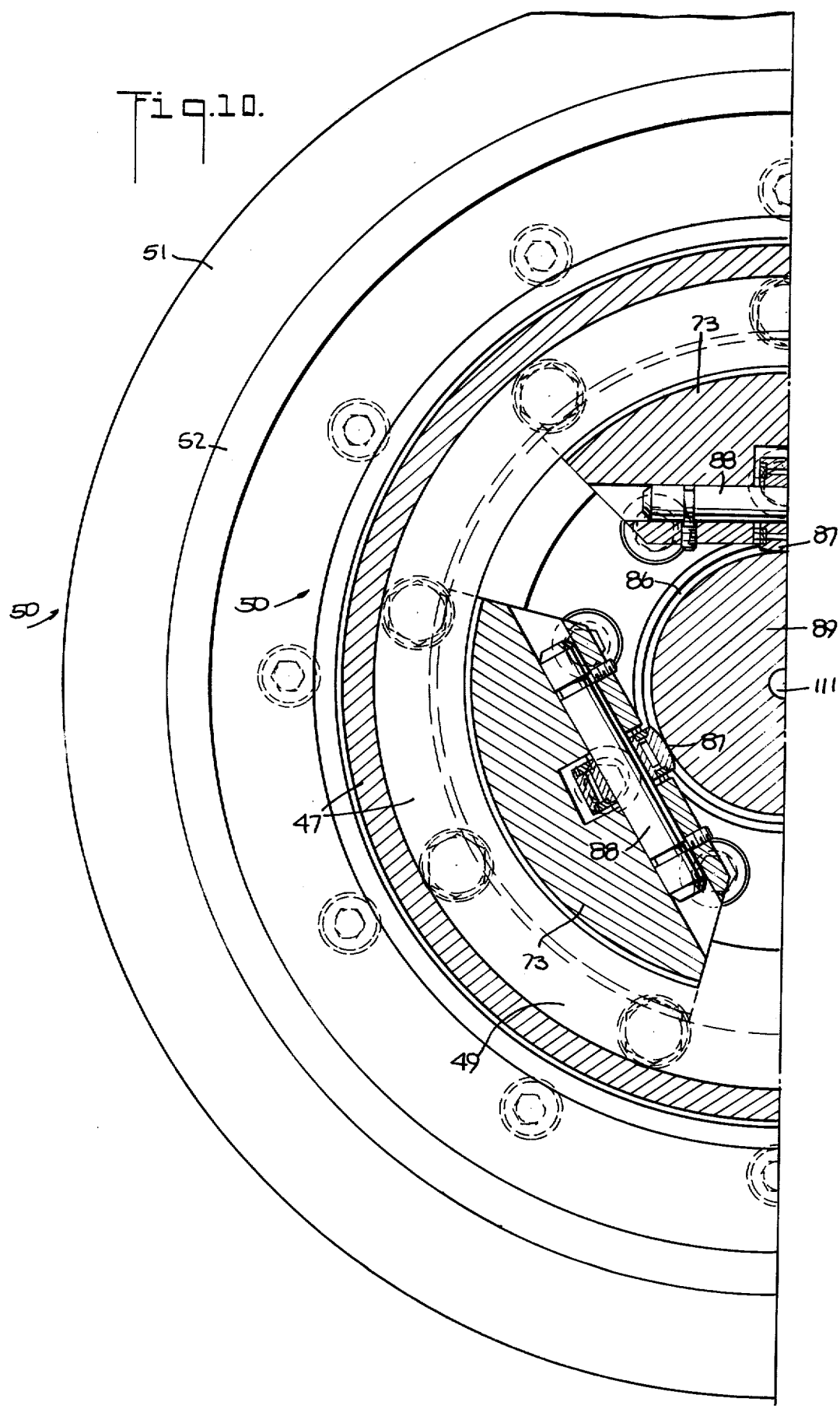
FIG. 10 is a still further enlarged partial cross-sectional view taken along the section line X—X in FIG. 7.

However, pursuant to a preferred embodiment of the present invention, there are provided three such latch member 73, as best illustrated in FIG. 10. The latch members 73 are distributed equidistantly from one another circumferentially of the interior of the hub 47 and are in unison or simultaneously radially displaced by the cam-acting member 84 when the frustoconical surface of the latter engages the respective rollers 87 of the latch members 73.

The cam-acting member 84 constitutes an extension of a tubular member 89 which is endwise shiftable within the confines of the shaft portion 40. The end portion of the shaft portion 39 is provided with a recess 90 in which is confined a tubular member or sleeve 91 for receiving axially the end 85 of the cam-acting member 84 when the tubular member 89 is shifted to the left to correspond in position to that illustrated in FIG. 7. The sleeve 91 is provided with an annular shoulder or flange 92 against which the end 85 of the cam-acting 84 is engageable for limiting the displacement of the latter. A suitable sealing gasket or ring 93 is affixed to the shoulder 92 to seal any spaces that may exist between the shoulder 92 and the end 85 of the cam-acting member 84.

As best illustrated in FIG. 8, the tubular member 89 is fixedly connected to a second tubular member 94 of reduced outer diameter which is likewise endwise or axially shiftable relative to the shaft portion 40. A coupling 95 functions to interconnect the tubular members 89 and 94 with one another. In order to facilitate axial sliding of the tubular member 89 relative to the shaft portion 40, there is provided a bushing 96 between the interior of the shaft portion 40 and the exterior of the tubular member 89. On the other hand, the smaller diameter tubular member 94 is slidably guided in a bore 97 formed in a plug 98 affixed to the right end of the shaft portion 40 by means of screws or the like.

The tubular members 89 and 94 which are affixed to one another are adapted to function in a manner akin to a piston rod of a power cylinder. Thus, in order to effect displacement of the connected tubular members 89 and 94, there is provided an annular piston ring 99 which is affixed to the exterior of the tubular member 94 and is slidingly confined within a cylinder-like member 100. The cylinder 100 at one end is closed by means of an annular abutment block 101 which acts to limit the displacement of the piston ring 99 and, thereby, that of the tubular member 94 in a direction to the left in FIG. 8. The plug 98 is affixed to the right end of the cylinder 100 and acts to limit displacement of the piston ring 99 in a direction to the right in FIG. 8. Accordingly, the abutment 101 and the plug 98 constitute means for defining an axially variable chamber 102 in the cylinder 100 into which a fluid may be introduced to effect displacement of the piston ring 99.

The plug 98 is provided with an axially directed duct 103 through which a pneumatic or hydraulic fluid may be introduced into the chamber 102 and, alternately, exhausted therefrom. The plug 98, furthermore, is provided with a second duct 104 that extends generally parallel to but is isolated from the duct 103. The duct 104 communicates likewise with the chamber 102 through the intermediary of a radially disposed orifice 105, a pair of axially communicating annular channels 106 and 107, and a further radially disposed orifice 108, the latter being disposed adjacent to the annular abutment block 101. Accordingly, when fluid is introduced through the duct 103 the piston ring 99 will be shifted to the left in FIG. 8. Similarly, when a fluid is introduced into the duct 104, the piston ring 99 will be shifted to the right in FIG. 8.

It will be understood that appropriate sealing gaskets or the like 109 and 110 are provided for preventing fluid leakage from the chamber 102 when fluid is introduced thereinto. It will be further understood, although not illustrated, that there are provided appropriate fluid input and output means which intercommunicate the internally confined ducts 103 and 104 with the exterior of the shaft portion 40, such means being conventional.

The connected tubular members 89 and 94 are provided with mutually communicating central bores 111 which are open at their opposite ends, the bore 111 in the tubular member 89 communicating with the recess 90 formed in the hub 46 of the shaft portion 39, and the bore 111 in the tubular member 94 communicating with a centrally defined bore 118 formed in the plug 98. The bore 118 in the plug 98 communicates at its opposite end with a constriction or passageway 119 through which a fluid may be introduced so as to pass through the bore 111 for effecting inflation of a tire sample. In this respect, the recess 90 formed in the hub 46 communicates with an annular space 112 which in turn communicates with a passageway 113. The passageway 113 in turn communicates with the exterior of the hubs 46 and 47 and with the interior of a tire sample mounted on the members 50.

Appropriate sealing gaskets 114 (FIG. 8) and 115 (FIG. 7) are provided for preventing the leakage of the fluid from the passageways 111, 112 and 113. However, an annular duct 116 is provided in the hub 47 for venting leaked fluid to the atmosphere, whereas an annular duct 117 is formed in the free end 85 of the tubular member 89 to exhaust fluid confined in the hubs 46 and 47 after the hubs 46 and 47 are separated from one another.

An important safety precaution taken with regard to the present invention is that a tire sample cannot be inflated or deflated unless the latch members 73 are in a fully locked or unlocked condition, respectively. In order to effect this, there is provided a control system which oversees or governs the admission or exhaustion of fluid into or out of the internally communicating hubs 46 and 47. The control system is operatively associated with the tubular member 94 as the latter is endwise shifted into forward and reverse positions for effecting locking or unlocking of the latch members 73 relative to the beak 75.

Figure 9:
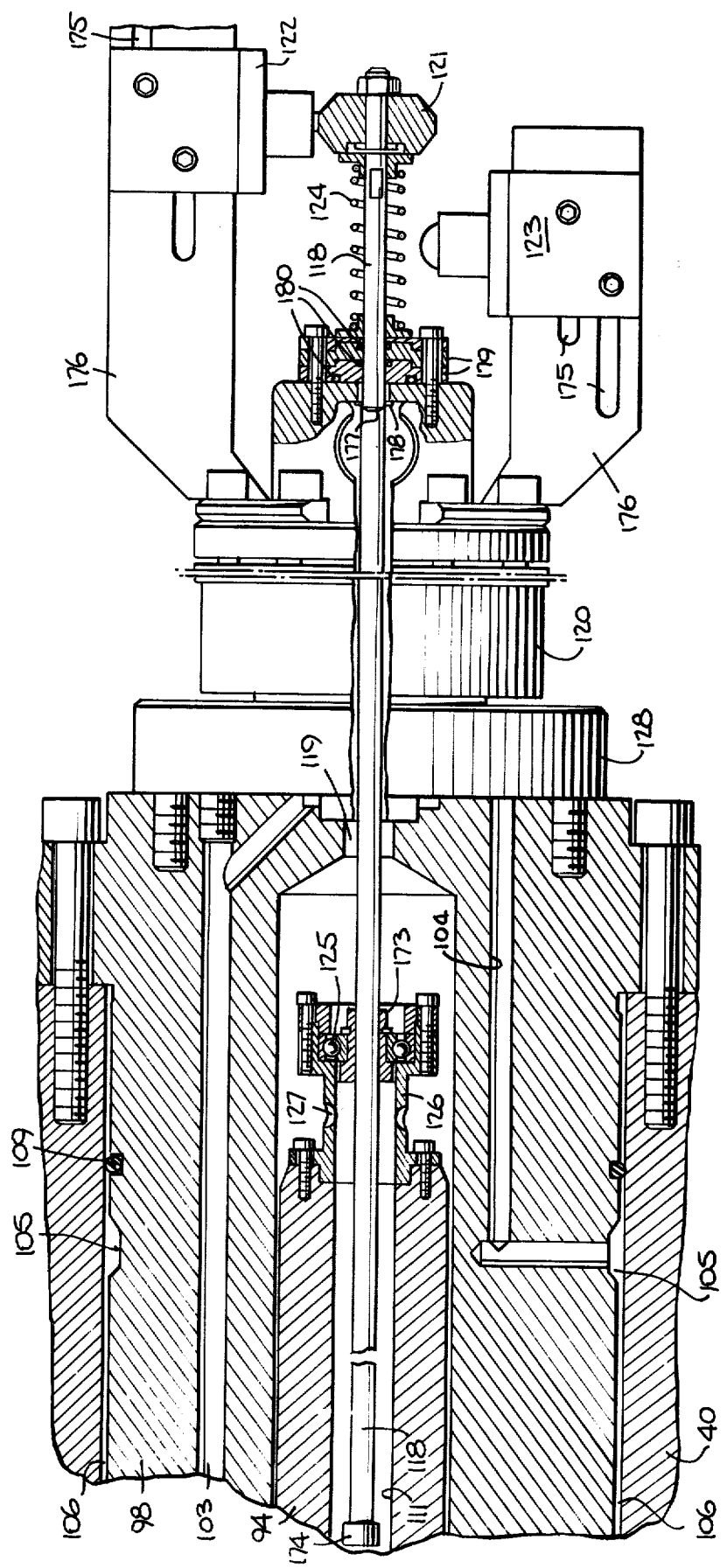
FIG. 9 is a further enlarged, fragmentary, axially taken, partial cross-sectional view of the right-end portion of the assembly illustrated in FIG. 8.

In this respect, as best illustrated in FIG. 9, one portion of a shiftable rod 118 is partially confined in and axially slidable relative to the bore 111 formed in the tubular member 94, the other portion of the rod 118 projecting through the passageway 119 formed in the tubular member 94, into a pair of housings 120 and 128 and beyond and out of the latter housings so as to present a free end portion upon which is mounted a cam-acting member 121. The cam-acting member 121 is adapted to operatively engage and activate, alternately, either one of a pair of depressible microswitching elements 122 and 123. A compression spring 124 surrounds the free end portion of the rod 118 and engages at one end the cam-acting member 121 and at the other end a portion of the housing 120. The spring 124 acts to urge the rod 118 in a direction toward the right in FIG. 9 and into engagement with a depressible portion of the microswitching element 122.

The microswitching elements 122 and 123 are separated from one another in a direction axially relative to the rod 118 by a distance corresponding to the distance over which the rod 118 is shiftable between two extreme positions, namely a first position wherein the connected tubular members 89 and 94 are in a rightmost position relative to the shaft portion 40, and a second position wherein the free end 85 of the tubular member 89 is in a left-most position in abutment with the flange 92 in the recess 90 of the shaft portion 39.

As illustrated in FIG. 9, the right end of the tubular member 94, proximate the passageway 119, is provided with a bearing assembly 125 in and relative to which the rod 118 is both axially and rotatably displaceable. The bearing assembly 125 is mounted upon a sleeve 126 having radially disposed orifices 127, the sleeve 126 being affixed to the right end of the tubular member 94 such as by means of screws or the like. It is through the radially disposed orifices 127 that the bore 111 formed in the tubular member 94 communicates with the bore 97 formed in the plug 98.

A second sleeve 173 formed as part of the bearing assembly 125 is engageable axially with an abutment or flange 174 formed on the opposite end of the rod 118 when the tubular member 94 is displaced to the left in FIG. 9. to effect locking of the latch member 73. Upon engaging the flange 174, the sleeve 173 will thereby shift the rod 118 to the left and cause the cam-acting member 121 to engage and actuate the depressible portion of the microswitching element 123, thereby signaling locking of the latch members 73.

The distance between sleeve 173 and the flange 174 (FIG. 9) is substantially greater than the distance between the microswitching elements 122 and 123 axially of the rod 118. Thus, the connecting tubular members 89 and 94 may be axially shifted to the left to initiate locking the latch members 73 and yet continue to move further to the left for a prescribed distance after locking of the latch members 73 and prior to any movement whatsoever of the rod 118 until the sleeve 173 carrried by the right end of the tubular member 94 axially engages the flange 174 on the rod 118. This ensures that the latch members 73 are locked prior to the activation of the microswitching element 123.

Such an arrangement also permits the microswitching elements 122 and 123 to be spaced from one another axially relative to the rod 118 over a space-saving distance which is substantially less than the overall distance that the connected members 89 and 94 are to be shifted for effecting locking of the latch members 73. Moreover, the relative positions of the microswitching elements 122 and 123 may be selectively altered relative to slots 175 formed in respective support brackets 176 connected to the housing 120. It will be understood that when the shaft portion 40 is shifted to the left to carry its corresponding bead-holding disc 50 into proximity with the bead-holding disc 50 carried by the shaft portion 39, there is no displacement of the rod 118 relative to the tubular member 94 or for that matter relative to the shaft portion 40.

It will be further understood that when the connected tubular members 89 and 94 are shifted to the right in FIG. 7, to effect unlocking of the latch members 73, thereby causing the sleeve 173 to disengage from the flange 174 formed on the rod 118, the spring 124 will urge the rod 118 to the right and carry the cam-acting member 121 away the microswitching element 123 and into engagement with the microswitching element 122. In order to control the maximum displacement of the rod 118 to the right by the spring 124, there is provided a second flange 177 on the rod 118 which is engageable with a cover plate unit 178 affixed to the housing 120. Thus, when the sleeve 173 formed on the right end of the tubular member 94 entirely releases the flange 174 formed on the rod 118, the second flange 177 formed on the rod 118 acts to control the maximum displacement of the rod 118 as effected by the spring 124.

In order to obviate fluid-leakage from the housing 120, the housing 120 constituting the means through which pneumatic or hydraulic fluid is introduced into the ducts 103 and 104, the coverplate unit 178 is provided with a series of plates 179 which are separated from one another through the intermediary of respective sealing gaskets 180 or the like. Furthermore, in order to permit the shaft portion 40 to rotate relative to the sleeves 43, and prevent rotation of the microswitching elements 122 and 123, the housing 120 is restrained against rotation by conventional means (not shown), and is operatively associated with a secondary housing 128 through the intermediary of conventional rotary coupling means, the details of which are omitted herefrom because of the conventional nature thereof. Thus, the shaft portion 40 and the housing 128 are commonly rotatable relative to the non-rotatable housing 120 and sleeves 43.

The microswitching elements 122 and 123 are each operatively associated in a conventional manner with means for introducing and exhausting alternately fluid into and from the power cylinder-acting chambers 56 of the shaft portions 39 and 40 to effect displacement of the bead-holding discs 50, and into and from the bore 111 in the connected tubular members 89 and 94 to selectively effect inflation or deflation of a tire sample. The microswitching element 122 is adapted to detect when the latch members 73 are unlocked, the microswitching element 122 then by conventional means effecting exhausting of fluid from the power cylinder-acting chambers 56 in each of the shaft portions 39 and 40. On the other hand, the microswitching element 123, likewise via conventional means, serves to detect when the latch members 73 are locked to effect an introduction of fluid into the tire sample via the bore 111 and ducts 112 and 113.

Referring again to FIGS. 1 and 2, there is illustrated the means for effecting rotation of the shaft portion 39 which in turn when clamped with the shaft portion 40 effects rotation of the latter likewise. In this respect, a gear reduction assembly 130 is operatively associated with the shaft 39 through the intermediary of a clutch assembly 131. The gear reduction assembly 130 includes a carriage 132 which is slidable upon a pair of spaced tracks 133 in a direction parallel to the axis of the shaft portions 39 and 40. The tracks 133 are mounted upon a raised base 134 affixed to the stationary frame 1. The gear reduction assembly 130 further includes a reversible electric motor 135 (FIG. 2) which via a coupling 136 drives a shaft 137 of the assembly 130 for effecting rotation of transmission gears 138. An output shaft 139 which is driven by the gears 138 is secured to a clutch driving plate 140 of the clutch assembly 131. The driving plate 140 is operatively associated in a frictional manner with a driven plate 141 of the clutch assembly 131. The driven plate 141 is secured to the end 53 of the shaft portion 39. The driving plate 140 may be separated from the driven plate 141 via the carriage 132 to terminate rotation of the shaft portion 39 when the carriage 132 is shifted to left in FIG. 2.

In order to effect shifting of the carriage 132 either to the left or the right, to effect engagement or disengagement of the clutch assembly 131, there is provided a horizontally disposed power cylinder or jack 142. The cylinder of the jack 142 is affixed to the frame 134, whereas the piston rod thereof is affixed to the carriage 132. A pair of jacks 143 are furthermore vertically disposed between the raised base 134 and the carriage 132 for purposes of pressing the carriage 132 vertically against the tracks 133 when the clutch assembly 131 is engaged in order to obviate inadvertent disengagement of the clutch assembly 131. A further jack 144 is provided on the carriage 132, the jack 144 having a piston rod 145 which can project into a corresponding passageway 146 formed in the base 134 when the clutch assembly 131 is engaged. Accordingly, the jacks 143 and 144 serve as means for preventing vertical and horizontal displacement of the carriage 132 when the clutch assembly 131 is engaged to effect rotation of the shaft portion 39.

As best illustrated in FIG. 1, there is provided a depressible pedal 147 or the like which is disposed along the vertical plane 5 between the bead-holding discs 50. The pedal 147 is adapted to be depressed by the weight of a pneumatic tire sample when the frame 2 is in its lowermost position as illustrated in FIG. 5. When the depressible pedal 147 is depressed, it acts to initiate cycling of the machine and testing of the pneumatic tire sample.

Referring now to FIGS. 12-15, there is illustrated the means for measuring the dimensional characteristics of a tire sample. Such means includes a pair of tread-sensing elements 148 and a pair of side-wall-sensing elements 149. The sensing elements 148 and 149 are mounted upon an assembly 150 which is symmetrically disposed relative to the vertical plane 5. The assembly 150 is mounted upon the cross-beam 9 of the pivotal frame 2 and includes a carriage 151 which is vertically displaceable for movement toward and away from a tire sample held by the members 50. A vertically disposed power cylinder or jack 152 is operatively associated with the carriage 151 to effect movement of the latter. The carriage 151 is affixed to a shoe 181, the shoe 181 being vertically slidable in a track 182 which is vertically affixed to a bracket 183 mounted upon the pivotal frame 2.

The carriage 151 may be locked in an elevated condition above the tire sample by means of a jack 153 which is mounted upon a bracketed platform 155 above the bracket 183. The jack 153 is mounted horizontally on a bracket 184 and is adapted to actuate a retractabl pin 185 into and out of an appropriate aperture formed in the upper region of the carriage 151. The retractable pin 185 slides endwise in a fixed guide 186 mounted upon the bracketed platform 155, and is integral with a cam-acting member 187 for activating a microswitching assembly 188 when the pin 185 is fully retracted to release the carriage 151 from its raised position.

The cylinder of the jack 152 if affixed at its bottom to a bracket 154 which in turn is affixed to a second bracket 156, each of which is integral with the carriage 151. The piston rod of the jack 152, on the other hand, is affixed to a cantilevered bracket 159 at the upper end of the unit 150 so that when the jack is actuated the cylinder of the jack 152 is displaced downwardly to thereby effect downward movement of the carriage 151.

The maximum stroke of the jack 152 can be controlled by means of a threaded shaft 157 rotatably mounted at its upper end in a bearing 158 which is confined in the upper bracket 159 to which is connected the piston rod of the jack 152. The extreme upper end portion of the threaded shaft 157 is affixed to a knurled knob 189 which when rotated will effect rotation of the shaft 157. The intermediate portion of the shaft 157 is confined within a tubular member 161 which terminates at its lower end in a plate 190 which is also affixed to the bracket 156 and, thereby, to the carriage 151. A square nut 160 is threadedly mounted upon the shaft 157, and is prevented from rotating relative to the tube 161 because of a conforming square cross-section presented by the interior of the tube 161.

When the knurled knob 189 is rotated causing the shaft 157 to rotate, the nut 160 will move upwardly or downwardly depending upon which direction the shaft is rotated. The nut 160 whose position is thus vertically adjustable, represents an abutment against which an upper inner shoulder 191 affixed to the tubular member 161 is engageable when the tube 161 shifts downwardly together with the carriage 151 to position the elements 148 and 149 into operative association with the pneumatic tire sample. Engagement of the shoulder 191 with the nut 160 limits the stroke of the jack 152.

The assembly 150 further includes a substantially horizontally disposed cross-beam 162 which is affixed to the carriage 151 by means of clamps 192 or the like. The cross-beam 162 is provided with an elongate slot, and at its opposite end portions supports a pair of bracket members 164 whose positions are adjustable along the slots by means of screws 193 or the like. Each of the brackets 164 supports a vertically adjustable post 163 by means of screws 194 or the like.

Figure 15:
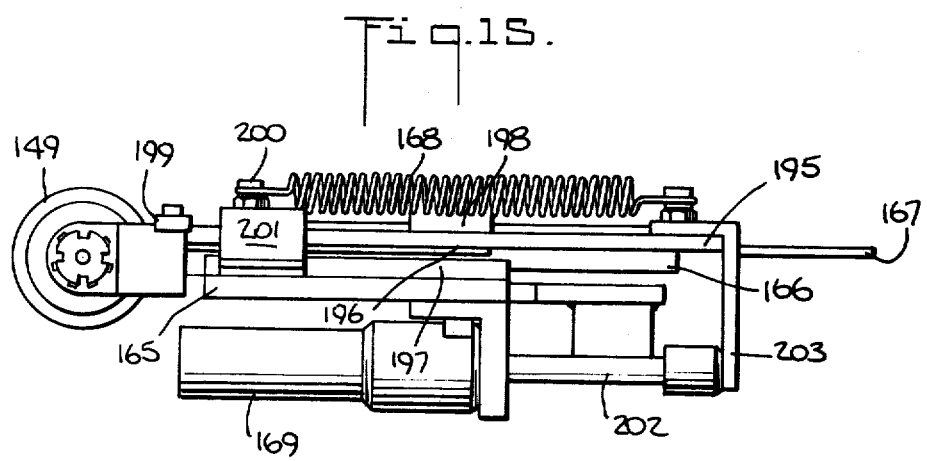
FIG. 15 is an enlarged view looking upwardly in the direction of arrow XV in FIG. 12 of one of the sensing units.

The lower end portion of each post 163 mounts a respective sidewall-sensing element 149, the latter each being disposed generally parallel to the cross-beam 162 and mounted on a respective bracket member 165. As best illustrated in FIG. 15, each element 149 is in the form of a roller which is mounted on an endwise shiftable plate 195. Each plate 195 is affixed to a shoe 196 which is slidable along a corresponding track 197 affixed to a respective one of the brackets 165. Each plate 195 is confined within its corresponding cylinder 166 which by means of a flange 198 is affixed to a corresponding one of the brackets 165. Each cylinder 166 includes an electromagnetic coil (not shown) which surrounds a rod 167. Each rod 167 is affixed to one end of a corresponding one of the plates 195 by means of a clamp 199 and is, therefore, shiftable endwise together with its associated plate 195. Shifting of the rods 167 is measurable by means of their associated coils and conventional means (not shown) operatively associated with the coils for measuring and recording the coil responses.

A helical tension spring 168 is affixed at one end to a respective flange 201 of each of the brackets 165 by means of a respective nut 200 or the like. The opposite end of each tension spring 168 is affixed to its corresponding plate 195 also by means of a nut or the like. Each spring 168 thus acts to urge the sensing element 149 associated therewith toward the tire sample. Each bracket 165, furthermore, supports the cylinder portion of a power cylinder or jack 169 having a piston rod 202 affixed to a bracket 203 which in turn is secured to a corresponding one of the plates 195. Each piston rod 202 when protracted removes the sensing element 149 associated therewith from the surface of the sidewall of the tire sample, and when retracted moves its associated element 149 into proximity with the tire sample. The springs 168 effect resilient engagement of the elements 149 with the tire sample independently of the jacks 202 after the latter move the elements 149 into proximity with the tire sample.

The tread sensing elements 148 are generally of the same nature as those of the elements 149. In this respect, each sensing element 148 is in the form of a roller journaled upon a respective plate 205 that is slidingly mounted upon a respective bracket 172. Each bracket 172 is supported on and adjustable in position relative to a respective sleeve 203 by means of a turn screw 204 or the like. Each sleeve 203 is affixed to the carriage 151 for vertical displacement therewith. Each plate 205 is affixed by means of a flange 210 to a respective rod 170 which is confined within a corresponding cylinder 171. Each rod 170 is surrounded by an electromagnetic coil (not shown) which is associated with a conventional system (not shown) for determining the extent of displacement of the rods 170 relative to their corresponding cylinders 171, via the coil responses.

Each cylinder 171 is secured via a flange 206 to a corresponding one of the brackets 172. A helical compression spring 173 is associated with each bracket 172, each spring 178 having one end portion which is fixed to an associated one of the cylinders 171, and an opposite end portion which is affixed to an associated one of the movable plates 205. Thus, each spring 173 acts to urge its associated plate 205 downwardly into pressing association with the tread of the tire sample. Withdrawal of the sensing elements 148 away from the tire sample tread is effected by means of the aforementioned jack 152 which when actuated elevates the carriage 151. An abutment member 211 which is affixed to the cylinder of the jack 152, via the bracket 156, is engageable with a microswitching element 212, of conventional nature, for inactivating the jack 152 when the cylinder of the jack 152 reaches its uppermost inactive position.

OPERATION OF THE MACHINE

Initially, the machine or apparatus is an inactive condition. When in the latter condition, the electric motor 135 (FIG. 2) is at rest and the carriage 132 for engaging the clutch assembly 131 is in a position to the extreme left upon the tracks 133 thereof as a result of a protracted condition of the jack 142. The jacks 143 and 144, on the other hand, are in a retracted condition freeing the carriage 132 for movement to the right to effect engagement of the clutch assembly 131. The shoes 15 are in a position as illustrated in FIG. 5, as a result of a retracted condition of the jacks 27. The pivotal frame 2 is in a lower position as illustrated in FIG. 5, and rests upon the inclined surface 18 of the shoes 15, as a result of a protracted condition of the jacks 12.

The shaft portions 39 and 40 upon which are mounted the bead-holding discs 50 are in respective positions spaced from one another as a result of a retracted condition of their associated jacks 56. The connected tubular members 89 and 94 are in a position to the extreme right of the shaft portion 40 such that the cam-acting member 121 carried by the rod 118 is in engagement with the microswitching element 122 as illustrated in FIG. 9. The latch members 73 are, therefore, in an unlocked condition relative to the beak 75 internally of the hub 46 of the shaft portion 39. The jack 102 associated with the connected members 89 and 94 is, thus, also in a retracted condition.

The unit 10 for measuring the dimensional characteristics of a pneumatic tire sample is in a raised position, as a result of the retracted condition of the jack 152 and a locking of the carriage 151 by the retractable pin 185. The jacks 169 associated with the sidewall-sensing elements 149 of the unit 10 are at this time in a protracted condition. The pedal 147 at the base of the stationary frame 1, is in a raised position and will not initiate cycling of the machine until depressed. Assuming that all other elements which require manual adjustment prior to activation of the machine are so adjusted, and that the bead-holding discs 50 have been selected with a proper diameter corresponding to a given tire sample to be tested, the machine is in a condition ready for cycling.

An operator then manually positions a tire sample (such as that denoted by reference character 250) between the bead-holding discs 50, and upon the depressible pedal 147. The weight of the tire 250 depresses the pedal 147 which in turn intitiates an automatic cycling of the machine. In this respect, the jacks 56 associated with the shaft portions 39 and 40 are activated causing the shaft portions 39 and 40 to mutually approach and engage one another axially. The bead-rests 52 of each of the bead-holding discs 50, thereby, penetrate the central cavity of the tire 250 until the annular shoulders 51 of the bead-holding discs 50 engage the bead regions of the tire 250.

It is preferred, pursuant to the present invention, that the jack 56 associated with the shaft portion 40 be deactivated shortly after engagement of the shaft portions 39 and 40 with one another to exhaust the pressurized fluid therein. On the other hand, it is preferred that the jack 56 associated with the shaft portion 39 remain activated in a pressurized condition for most of the period of operation of the machine.

Once the shaft portions 39 and 40 have engaged one another, as determined by appropriate conventional microswitching elements (not shown), the power chamber 102 associated with the connected tubular members 89 and 94 is activated to effect displacement of the latter to the left to approach the shaft portion 39. As the tubular member 89 approaches the shaft portion 39, the camming surface 84 thereof acts to radially displace and pivot each of the latch members 72 into locking engagement with the beak 75 formed in the hub 46 of the shaft portion 39.

It will be understood that as the tubular member 94 shifts to the left, the bearing assembly 125 at the right end thereof shifts axially over a short distance before engaging the flange 174 on the rod 118 internally of the tubular member 94. Thus, there is a slight period during which the tubular member 94 moves relative to the rod 118 without effecting axial displacement of the latter. However, once the bearing assembly 125 engages the rod 118, the tubular member 94 carries the rod 118 toward the left causing the camming member 121 to shift out of engagement with the microswitching element 122 and into engagement with the microswitching element 123.

The microswitching element 123, once engaged, detects that the latch members 73 have been locked and gives a go-ahead signal for exhausting the jack 56 associated with the shaft portion 40. The microswitching element 123, furthermore, by conventional means initiates the introduction of pressurized fluid through the housing 120 and into the bore 111 to effect inflation of the tire 250. Since the jack 56 associated with the jack portion 40 has been exhausted previously, during inflation of the tire 250, the shaft portion 40 is permitted to shift slightly toward the right to allow full inflation of the tire 250. The extent of retraction of the shaft portion 40 is controlled by the latch members 73 which have a slight degree of axial play relative to the beak 75 in the hub 46 of the shaft portion 39. The jacks 12 associated with the pivotal frame 2 are then actuated to effect a pivotal uplift of the frame 2 relative to the stationary frame 1. It will be understood that the extent of inflation of the pneumatic tire 250 is governed by appropriate conventional pressure sensing devices (not shown) which act to limit the quantity of pressurized fluid into the tire 250 through the duct 111.

Once the pivotal frame 2 is in its uppermost raised position as effected by the retraction of the piston rods associated with the jacks 12, the jack 153 associated with the unit 10 for measuring the dimensional characters of the pneumatic tire 250 retracts the pin 185 and releases the vertically slidable carriage 151 to permit downward displacement of the latter. Release of the carriage 151 is sensed by the microswitching element 188 associated with the cam-acting member 187 of the retractible pin 185. The microswitching element 188 then gives a go-ahead signal for actuating the jack 152 to effect the downward displacement of the carriage 151 so that the sensing elements 148 engage the tread of the tire 250.

The jacks 27 associated with the shoes 15 are then actuated, either by means of the microswitching element 188 or by other conventional means (not shown), so as to position the shoes 15 below the heels 16 of the barrels 14. Such position of the shoes 15 is best trated in FIG. 4, the latter position being sensed by microswitching element (not shown) or other conv tional means. The latter in turn again actuate the jacks 12 to effect slight protraction of their respective piston rods and, thereby, pivotal movement of the frame 2 downwardly such that the heels 16 associated with the barrels 14 engage and rest upon the horizontal platform 17 presented by each of the shoes 15. In this position the tire sample 250 is in radial engagement with the drum 29.

Once the heels 16 rest upon platforms 17 of the shoes 15, either by means of a further microswitching element or other conventional means (not shown), the jack 142 associated with the carriage 132 for effecting displacement of the latter and in turn engagement of the clutch assembly 131 is actuated to retract its piston rod and effect engagement of the clutch assembly 131. Once the clutch assembly 131 has been engaged, the jacks 143 and 144 associated with the carriage 132 are actuated either by microswitching elements or other conventional means (not shown) to stabilize and lock the carriage 132 upon the tracks 133 therefor. The jacks 169 associated with each of the sidewall-sensing elements 149 are then actuated to retract their associated piston rods and carry the elements 149 into proximity with the sidewalls of the tire 250. The tension springs 168 thereby effect resilient engagement of the elements 149 with the sidewalls of the tire 250.

After the clutch 131 has been engaged, as is determined by a microswitching element or other conventional means (not shown), a go-ahead signal is relayed to the motor 135 to effect rotation of the shaft portion 39. Since the shaft portion 40 is interlocked with the shaft portion 39, via the latch members 73, rotation of the shaft portion 39 is transmitted to the shaft portion 40 and likewise to each of the bead-holding discs 50. The tire 250 is, thus, rotated while pressed against the drum 29 relative to the sensing elements 148 and 149 which via conventional measuring means (not shown) measures and records the dimensional characteristics of the tread and sidewalls of the tire 250. It will be understood that the electric motor 135 can rotate the shaft portions 39 and 40 in opposite directions and, therefore, the sensing elements 148 and 149 can effect measurement of the dimensional characteristics of the freed and sidewalls of the tire 250 in each of two circumferential directions.

Once testing of the tire 250 has been effected, the cycle reverses itself until all activated elements are restored to an initial condition to permit testing of second and subsequent tire samples.

It will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. Apparatus for measuring dimensional characteristics of a pneumatic tire sample, said apparatus comprising:

a. a frame;
   b. a pair of coaxially aligned, confronting, bead-holding members shiftably supported on said frame for movement toward and away from one another and, thereby, into and out of bead holding association with corresponding bead region of a pneumatic tire sample;

c. power means for selectively shifting said bead-holding members toward and away from one another;

d. locking means for clamping said bead-holding members to one another when the latter are in bead holding association with the tire sample;

e. tire inflation means operatively associated with said bead-holding members for inflating the tire sample between and from within said bead-holding members when the latter are in bead holding association with the tire sample;

f. tire sensing means shiftably mounted on said frame for effecting measurement of selected dimensional characteristics of the inflated tire sample;

g. further power means for shifting said tire sensing means into and out of operative engagement with selected portions of the tire sample, and h. drive means for rotating the clamped bead-holding members and, thereby, the tire sample relative to said tire sensing means when the latter is in operative engagement with the tire sample, said frame including a stationary frame portion and a pivotal frame portion hinged upon said stationary frame portion, said stationary frame portion including a road-simulating drum freely journaled thereupon, said pivotal frame portion supporting said bead-holding members and being displaceable pivotally relative to said stationary frame portion such that the tire sample held by said bead-holding members is engageable radially with said drum.

2. Apparatus as claimed in claim 1, including at least one power cylinder interconnecting said pivotal and stationary frame portions for effecting displacement of said pivotal frame portion relative to said stationary frame portion.

3. Apparatus as claimed in claim 1, including means for radially adjusting the axial position of said drum relative to said stationary frame portion.

4. Apparatus as claimed in claim 3, wherein the latter said means includes a threaded shaft terminating in one end portion which is operatively associated with said drum and in an opposite end portion upon which is affixed a hand-wheel, an intermediate portion of said shaft being rotatably mounted in and endwise movable relative to a conforming internally threaded bracket affixed to said stationary frame portion.

5. Apparatus as claimed in claim 1, including a pair of shaft portions upon which are mounted said bead-holding members, respectively, and a pair of shoes shiftably supported on said stationary frame portion for movement between first and second positions, said shoes when in said first position supporting said shaft portions and, thereby, said pivotal frame portion in an elevated condition such that said drum and tire sample are engaged, said shoes when in said second position freeing said shaft portions and pivotal frame portion to pivot downwardly and disengage the tire sample from said drum.

6. Apparatus as claimed in claim 5, including at least one power cylinder operatively associated with and interposed between said stationary frame portion and said shoes for effecting displacement of the latter to and from said first and second positions.

7. Apparatus as claimed in claim 6, including means for adjusting the position of said shoes relative to said stationary frame portion independently of said power cylinder.

8. Apparatus as claimed in claim 7, wherein the latter said means includes a threaded shaft terminating in one end portion which is operatively associated with said power cylinder and in an opposite end portion which is operatively associated with a hand-wheel, an intermediate portion of said threaded shaft being rotatably mounted in and endwise movable relative to a conforming internally threaded bracked affixed to said stationary frame portion.

9. Apparatus as claimed in claim 1, wherein said drive means includes a motor affixed to said stationary frame portion, and a clutch operatively associated with and interposed between said motor and one of said bead-holding members mounted upon said pivotal frame portion, said clutch including a driving element rotated by said motor and a driven element operatively associated with the latter said bead-holding member for transmitting rotary motion thereto, and means for selectively shifting said driving element axially into and out of operative engagement with said driven element.

10. Apparatus as claimed in claim 9, wherein the latter said means includes a carriage upon which said driving element is supported, at least one track upon which said carriage is shiftably supported, said track being affixed to said stationary frame portion and extending parallel to the axis of rotation of said bead-holding members, and a power cylinder operatively associated with and interposed between said carriage and said stationary frame portion.

11. Apparatus as claimed in claim 1, wherein each of said bead-holding members is provided with a substantially circular body portion and an annular flange portion of increased diameter.

12. Apparatus as claimed in claim 11, wherein each of said body portions is generally frusto-conical.

13. Apparatus as claimed in claim 11, wherein said annular flange portions are separated from one another through the intermediary of said body portions.

14. Apparatus for measuring dimensional characteristics of a pneumatic tire sample, said apparatus comprising:

a. a frame;

b. a pair of coaxially aligned, confronting, bead-holding members shiftably supported on said frame for movement toward and away from one another and, thereby, into and out of bead holding association with corresponding bead regions of a pneumatic tire sample;

c. power means for selectively shifting said bead-holding members toward and away from one another;

d. locking means for clamping said bead-holding members to one another when the latter are in bead holding association with the tire sample;

e. tire inflation means operatively associated with said bead-holding members for inflating the tire sample between and from within said bead-holding members when the latter are in bead holding association with the tire sample;

f. tire sensing means shiftably mounted on said frame for effecting measurement of selected dimensional characteristics of the inflated tire sample;

g. further power means for shifting said tire sensing means into and out of operative engagement with selected portions of the tire sample; and h. drive means for rotating the clamped bead-holding members and, thereby, the tire sample relative to said tire sensing means when the latter is in operative engagement with the tire sample, and including a pair of shaft portions upon which said bead-holding members are mounted, respectively, a pair of sleeves surrounding a respective part of each of said pair of shaft portions, said shaft portions being rotatably mounted in said sleeves but constrained against axial movement relative to the latter, and a pair of housings surrounding a respective part of each of said pair of sleeves and in and relative to which said sleeves together with said shaft portions are axially shiftable, each of said housings defining with its corresponding sleeve an axially variable annular chamber terminating at one end in an annular flange affixed to its corresponding sleeve internally of each housing and at an opposite end in an annular flange affixed to and internally of each said housing.

15. Apparatus as claimed in claim 14, wherein each said housing includes a further internal annular flange affixed thereto and spaced axially from the first said flange affixed to each said housing, said flange affixed to each said sleeve being intermediate said flanges which are affixed to each said housing and defining with the latter said further internal flange a further axially variable annular chamber which cooperatively with the first said annular chamber increases or decreases in axial dimension as the first said annular chamber decreases or increases in axial dimension, respectively, as a function of the direction of movement of said flange affixed to each said sleeve.

16. Apparatus as claimed in claim 15, including means intercommunicating each of said annular chambers with the exterior of said housings for channeling pressurized fluid to and from said chambers to selectively displace said annular flange affixed to each said sleeve and, thereby, each said sleeve relative to its corresponding housing.

17. Apparatus as claimed in claim 14, wherein each of said bead-holding members and at least one of said shaft portions is hollow, and including at least one latch member pivotally mounted in one of said bead-holding members and sufficiently long to extend into the other of said bead-holding members when said bead-holding members are shifted into close proximity with one another, the other of said bead-holding members including internally thereof a beak lockingly engageable by said latch member, and camming means shiftably mounted axially in said hollow shaft portion for engaging and pivoting said latch member into locking engagement with said beak.

18. Apparatus as claimed in claim 17, including resilient means for urging said latch member out of locking engagement with said beak when said camming means releases said latch member.

19. Apparatus as claimed in claim 17, including two further latch members equidistantly spaced from the first said latch member circumferentially of the interior of said one bead-holding member, all of said latch members being substantially identical, engageable with said beak and pivotally displaceable by said camming means.

20. Apparatus as claimed in claim 17, wherein said camming means defines cooperatively with the interior of said hollow shaft portion an axially variable annular chamber terminating at one end in an annular flange affixed to said camming means internally of said hollow shaft portion and at an opposite end in an annular flange affixed to and internally of said hollow shaft portion.

21. Apparatus as claimed in claim 20, wherein said hollow shaft portion includes a further internal annular flange affixed thereto and spaced axially from the first said annular flange affixed to said hollow shaft portion, said flange affixed to said camming means being intermediate said flanges which are affixed internally of and to said hollow shaft portion and defining with the latter said further internal flange a further axially variable annular chamber which cooperatively with the first said annular chamber internally of said hollow shaft portion increases or decreases in axial dimension as the latter said first annular chamber decreases or increases in axial dimension, respectively, as a function of the direction of movement of said flange affixed to said camming means.

22. Apparatus as claimed in claim 21, including means intercommunicating each of the latter said annular chambers with the exterior of said hollow shaft portion for channeling pressurized fluid to and from the latter said chambers to selectively displace said annular flange affixed to said camming means and, thereby, said camming means relative to said hollow shaft portion.

23. Apparatus as claimed in claim 17, including detecting means for sensing both locked and unlocked conditions of said latch member, said detecting means including a pair of microswitching elements spaced axially from one another and affixed to said hollow shaft portion, actuating means for selectively activating said microswitching elements alternately, said actuating means being operatively associated with said camming means and displaceable by the latter axially relative to said hollow shaft portion, said actuating means including a cam-acting member which is alternately engageable with said microswitching elements as a function of the direction of movement of said camming means and, thereby, said actuating means relative to said hollow shaft portion.

24. Apparatus as claimed in claim 23, wherein said actuating means further includes an elongate rod at one end of which is affixed said cam-acting member, said camming means being hollow and slidably supporting therein an opposite end portion of said rod, the latter said end portion of said rod and said hollow camming means including respective abutment members which are engageable with one another to effect axial displacement of said rod relative to said hollow shaft portion when said hollow camming means is shifted.

25. Apparatus as claimed in claim 24, wherein said rod has a sufficiently long axial extent to maintain its abutment in axially spaced relation relative to the abutment of said hollow camming means when the latter is in an extreme end position relative to said hollow shaft portion such that said latch member is unlocked, the mutually engageable abutments of said rod and hollow camming means remaining out of engagement during shifting of said hollow camming means into locking engagement with said latch member and until locking of the latter, said hollow camming means being further shiftable beyond the locking position of said latch member and into engagement with the interior of the bead-holding member opposite the one mounted upon said hollow shaft portion, during which further shifting the abutment of said rod is engaged by the abutment of said hollow camming means and is carried along with the latter to effect a transfer of said cam-acting element from one of said microswitching elements which detects the unlocked condition of said latch member to the other which detects the locked condition of said latch member, the axial distance between said microswitching elements being substantially less than the axial distance between said respective abutments of said rod and camming means when the latter is in said extreme end position relative to said hollow shaft portion.

26. Apparatus as claimed in claim 25, including resilient means interposed between said cam-acting member and the end exterior of said hollow shaft portion for urging said cam-acting member and, thereby, said rod to an at-rest end position into engagement with that microswitching element which detects the unlocked condition of said latch member.

27. Apparatus as claimed in claim 23, including a coupling interconnecting said microswitching elements to said hollow shaft portion, said coupling including a non-rotatable portion upon which are mounted said microswitching elements, and a rotatable portion affixed to said hollow shaft portion for rotation with the latter relative to said non-rotatable portion and said microswitching elements.

28. Apparatus as claimed in claim 17, wherein said tire inflation means includes duct means communicating the exterior of said hollow shaft portion with said hollow bead-holding members for channeling pressured fluid to the latter, said bead-holding members having a passageway for communicating the interior thereof with both the exterior thereof andn the interior of the tire sample held thereby.

29. Apparatus as claimed in claim 14, including means for preventing rotation of said sleeves relative to their corresponding housings, the latter said means including a rod affixed to each of said sleeves and extending in radially spaced, parallel, relation relative to the latter and externally of said housings, said housings each including guide means affixed to the exterior thereof and confining each said rod, said guide means permitting only axial displacement of each said bar relative thereto.

30. Apparatus for measuring dimensional characteristics of a pneumatic tire sample, said apparatus comprising:
a. a frame;
b. a pair of coaxially aligned, confronting, bead-holding members shiftably supported on said frame for movement toward and away from one another and, thereby, into and out of bead holding association with corresponding bead regions of a pneumatic tire sample;
c. power means for selectively shifting said bead-holding members toward and away from one another;
d. locking means for clamping said bead-holding members to one another when the latter are in bead holding association with the tire sample;
e. tire inflation means operatively associated with said bead-holding members for inflating the tire sample between and from within said bead-holding members when the latter are in bead holding association with the tire sample;
f. tire sensing means shiftably mounted on said frame for effecting measurement of selected dimensional characteristics of the inflated tire sample;
g. further power means for shifting said tire sensing means into and out of operative engagement with selected portions of the tire sample; and
h. drive means for rotating the clamped beadholding members and, thereby, the tire sample relative to said tire sensing means when the latter is in operative engagement with the tire sample, said tire sensing means including at least one tire tread sensing unit and at least one tire sidewall sensing unit, said frame including a bracket disposed adjacent to said bead-holding members, and a carriage slidably supported on said bracket, said tread and sidewall sensing units being mounted upon said carriage in spaced mutually perpendicular relation, said further power means including a power cylinder interconnecting said carriage and bracket and operatively associated with each of the latter to effect displacement of said carriage relative to said bracket, said tread and sidewall sensing units including respective further power cylinders for displacing said units into proximity with the tire sample, and resilient means for urging said units into operative engagement with the tire sample independently of said further power cylinders.

31. Apparatus as claimed in claim 30, wherein each of said tread and sidewall sensing units are provided as respective pairs, said carriage including means for adjusting the position of each of said units relative thereto and relative to respective positions on the tread and sidewalls of the tire sample.

32. Apparatus as claimed in claim 31, including power means affixed to said bracket and operatively associated with said carriage for locking the latter in a raised inoperative condition relative to the tire sample, said power means including a retractable pin engageable with said carriage and still a further power cylinder for protracting and retracting said pin.

33. Apparatus as claimed in claim 30, including means for selectively adjusting the stroke of the power cylinder of said further power means and, thereby, the extent of displacement of said carriage relative to said bracket.

34. Apparatus as claimed in claim 33, wherein the latter said means includes a threadedly adjustable shaft rotatably affixed to said bracket, a nut threaded on said shaft, a tube surrounding both said shaft and nut and affixed to said carriage, said tube terminating in an upper inner shoulder engageable with said nut when said carriage and, thereby, said tube is displaced downwardly by said further power means.

* * * * *